United States Patent
Sasaki et al.

(10) Patent No.: US 7,764,926 B2
(45) Date of Patent: Jul. 27, 2010

(54) COMMUNICATION RELAYING APPARATUS, COMMUNICATION RELAY, AND CONTROLLING METHOD

(75) Inventors: Hiroyuki Sasaki, Kawasaki (JP); Masayuki Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 11/874,319

(22) Filed: Oct. 18, 2007

(65) Prior Publication Data
US 2008/0247402 A1    Oct. 9, 2008

(30) Foreign Application Priority Data
Oct. 20, 2006   (JP)   ............... 2006-286851

(51) Int. Cl.
*H04B 3/36* (2006.01)
*H04B 7/14* (2006.01)

(52) U.S. Cl. .............. 455/14; 455/11.1; 455/13.1; 455/3.01

(58) Field of Classification Search .......... 455/3.01, 455/3.02, 3.05, 446, 452.1, 11.1, 7, 13.1, 455/15, 24, 500, 14, 428; 370/316, 313, 370/389, 401, 315, 245
See application file for complete search history.

(56) References Cited

U.S. PATENT DOCUMENTS

| | | | |
|---|---|---|---|
| 2005/0169206 A1* | 8/2005 | Nozaki | 370/316 |
| 2007/0002848 A1* | 1/2007 | Kudou et al. | 370/378 |
| 2009/0003329 A1* | 1/2009 | Murakami et al. | 370/389 |
| 2009/0219854 A1* | 9/2009 | Okuda | 370/315 |

FOREIGN PATENT DOCUMENTS

JP   2002-64540   2/2002

* cited by examiner

*Primary Examiner*—John Lee
(74) *Attorney, Agent, or Firm*—Katten Muchin Rosenman LLP

(57) ABSTRACT

A wide area network is constructed by connecting a plurality of bases to a multipoint switching apparatus. Each base has a certain contracted communication band. If a packet is received from a first base having a higher contracted communication band and the packet is directed to a second base having a lower contracted communication band, the traffic from the first base is limited to the contracted communication band of the second base.

18 Claims, 26 Drawing Sheets

Related Art

| PORT | MAC |
|------|-----|
| X | b1 |
| X | b2 |
| W | a1 |
| ⋮ | ⋮ |

| PORT | CONTRACTED BAND |
|------|-----------------|
| X | 2 Mbps |
| W | 100 Mbps |
| Y | 3 Mbps |
| ⋮ | ⋮ |

FIG.12

| INPUT PORT | OUTPUT PORT | BAND LIMIT |
|---|---|---|
| W | X | 2 Mbps |
| W | Y | 3 Mbps |
| Y | W | 100 Mbps |
| ⋮ | ⋮ | ⋮ |

| INPUT PORT | OUTPUT PORT | PRIORITY LEVEL |
|---|---|---|
| W | X | HIGH |
| W | Y | LOW |
| Y | W | MEDIUM |
| ⋮ | ⋮ | ⋮ |

| TRANSMISSION SOURCE ADDRESS | DESTINATION PORT | BAND LIMIT |
|---|---|---|
| a1 | X | 2 Mbps |
| a1 | Y | 2 Mbps |
| ⋮ | ⋮ | ⋮ |

| TRANSMISSION SOURCE ADDRESS | DESTINATION ADDRESS | BAND LIMIT |
|---|---|---|
| a1 | b1 | 2 Mbps |
| a1 | b1 | 2 Mbps |
| ⋮ | ⋮ | ⋮ |

| INPUT PORT | DESTINATION ADDRESS | BAND LIMIT |
|---|---|---|
| W | b1 | 2 Mbps |
| W | c1 | 2 Mbps |
| ⋮ | ⋮ | ⋮ |

116a

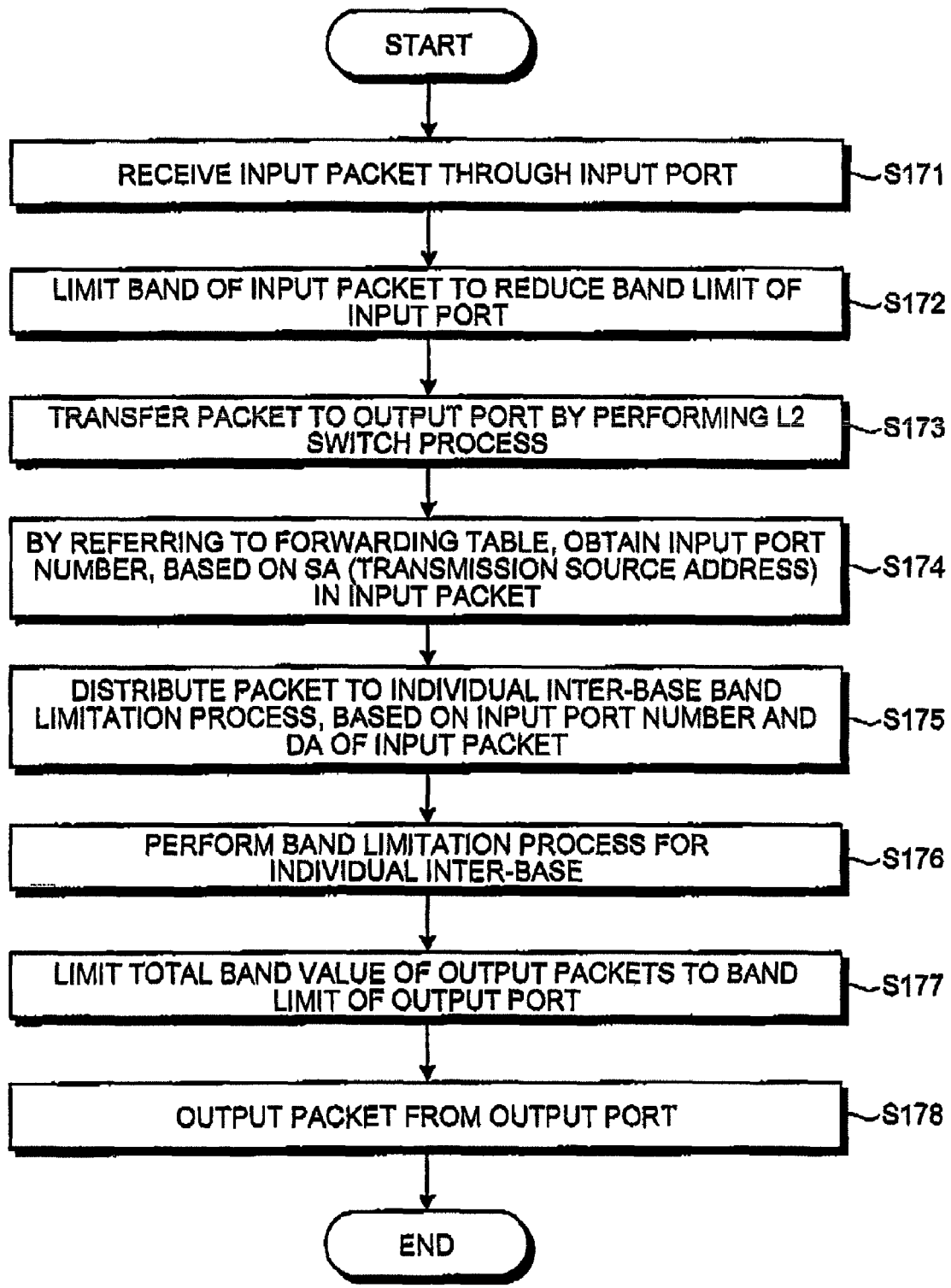

COMMUNICATION RELAYING APPARATUS, COMMUNICATION RELAY, AND CONTROLLING METHOD

BACKGROUND OF THE INVENTION

1. Field of the Invention

The present invention relates to a technology for relaying communication between bases in a wide area network.

2. Description of the Related Art

It is a common practice to construct a wide area Ethernet (registered trademark), which is a kind of a Wide Area Network (WAN), by using each of Local Area Networks (LANs) in an Ethernet as a base and connecting the bases with one another. One method for connecting the bases with one another is to connect the plurality of LANs to one communication relaying apparatus and to realize a full-mesh connection within the communication relaying apparatus. By using this method, it is possible to construct a full-mesh Ethernet network with a simply configuration.

In such a communication relaying apparatus, there is a possibility that, when packets that have been input from a plurality of bases have congestion, some of the packets may be discarded, and thus the quality of communication can degrade. To cope with this problem, as disclosed in Japanese Patent Application Laid-open No. 2002-64540, for example, a communication relaying apparatus that guarantees the minimum bands for the bases from which the packets are input and limits the traffic that can cause congestion within the communication relaying apparatus, so as to assure scalability of the Ethernet network has been proposed.

However, according to the conventional technique, disclosed in Japanese Patent Application Laid-open No. 2002-64540, a multipoint unit that is operable to switch and output traffic addressed to different bases is configured so that the traffic having been input thereto is switched regardless of the minimum band guaranteed for each of the bases. Thus, in sometime, traffic addressed to one of the bases can be occupied by traffic coming from another one of the bases that has a higher input traffic band. Consequently, there is a possibility that the occupancy tendency in the traffic becomes imbalance in the communication between the bases.

One example of a method for assuring a band for the communication between the bases is to append a virtual Local Area Network (VLAN) tag to each packet at each of the bases. According to this method, each packet is identified with a VLAN tag value so that a band is assigned to each of the bases on the output side. This method, however, has a problem because the VLAN tag appended to each packet makes the overhead of the packet larger and makes the band available to a user smaller. Also, another problem is that a user terminal is required to have a function of appending a VLAN tag to each packet, and the user is not able to use the appended VLAN tag freely.

SUMMARY OF THE INVENTION

It is an object of the present invention to at least partially solve the problems in the conventional technology.

According to an aspect to the present invention, a communication relaying apparatus that performs a relaying process on communication between a transmission base and a plurality of reception bases from among a plurality of bases included in a wide area communication network, includes a reception port configured to receive packets via a communication path between the communication relaying apparatus and the transmission base; a plurality of transmission ports each configured to transmit packets to a corresponding one of a communication path between the communication relaying apparatus and a corresponding one of the reception base; a band controlling unit that exercises a band control on a packet received at the reception port to limit a communication band of the packet based on destination base information contained in the packet; a determining unit that determines a first transmission port from among the transmission ports from where the packet that has been subjected to band control is to be output, and outputs the packet that has been subjected to band control to the first transmission port.

According to another aspect to the present invention, a communication relaying apparatus that performs a relaying process on communication between a plurality of transmission bases and a plurality of reception bases from among a plurality of bases included in a wide area communication network, includes a plurality of reception ports each configured to receive packets via a corresponding one of a communication path between the communication relaying apparatus and a corresponding one of the transmission base; a plurality of transmission ports each configured to transmit packets to a corresponding one of a communication path between the communication relaying apparatus and a corresponding one of the reception base; a determining unit that determines a first transmission port from among the transmission ports from where a packet received at a first reception port from among the reception ports is to be output; and a band controlling unit that exercises a band control on the packet whose output destination has been determined by the determining unit to limit a communication band of the packet based on transmission base information contained in the packet, and outputs the packet that has been subjected to band control to the first transmission port.

According to still another aspect to the present invention, a method of relaying communication to be executed on a relaying apparatus that performs a relaying process on communication between a transmission base and a plurality of reception bases from among a plurality of bases included in a wide area communication network, the communication relaying apparatus including a reception port configured to receive packets via a communication path between the communication relaying apparatus and the transmission base; and a plurality of transmission ports each configured to transmit packets to a corresponding one of a communication path between the communication relaying apparatus and a corresponding one of the reception base, includes exercising a band control on a packet received at the reception port to limit a communication band of the packet based on destination base information contained in the packet; and determining a first transmission port from among the transmission ports from where the packet that has been subjected to band control is to be output, and outputting the packet that has been subjected to band control to the first transmission port.

According to still another aspect to the present invention, a method of relaying communication to be executed on a communication relaying apparatus that performs a relaying process on communication between a plurality of transmission bases and a plurality of reception bases from among a plurality of bases included in a wide area communication network, the communication relaying apparatus including a plurality of reception ports each configured to receive packets via a corresponding one of a communication path between the communication relaying apparatus and a corresponding one of the transmission base; and a plurality of transmission ports each configured to transmit packets to a corresponding one of a communication path between the communication relaying apparatus and a corresponding one of the reception base, includes determining a first transmission port from among the transmission ports from where a packet received at a first reception port from among the reception ports is to be output; and exercising a band control on the packet whose output destination has been determined at the determining to limit a communication band of the packet based on transmission base information contained in the packet, and outputting the packet that has been subjected to band control to the first transmission port.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 depicts an example of contents of a forwarding table shown in FIG. 3;

FIG. 5 depicts an example of contents of a contracted band management table shown in FIG. 3;

FIG. 12 depicts an example of the contents of an inter-base band management table shown in FIG. 11;

FIG. 16 depicts an example of the contents of an inter-base band priority management table shown in FIG. 15;

FIG. 21 depicts an example of the contents of an inter-base band management table shown in FIG. 20;

FIG. 23 depicts an example of the contents of an inter-base band management table shown in FIG. 22;

FIG. 26 depicts an example of the contents of an inter-base band management table shown in FIG. 25; and FIG. 27 is a flowchart of a band controlling process performed by the multipoint switching apparatus shown in FIG. 26.

DETAILED DESCRIPTION OF THE PREFERRED EMBODIMENTS

Exemplary embodiments of the present invention will be explained in detail below with reference to the accompanying drawings. A first embodiment and a second embodiment of the present invention are applied to a multipoint switching apparatus that is a layer 2 switch used for constructing a wide area network by connecting a plurality of bases. In such a multipoint switching apparatus, traffic congestion can occur when packets from a plurality of bases flow into one base at the same time.

Figure 1:
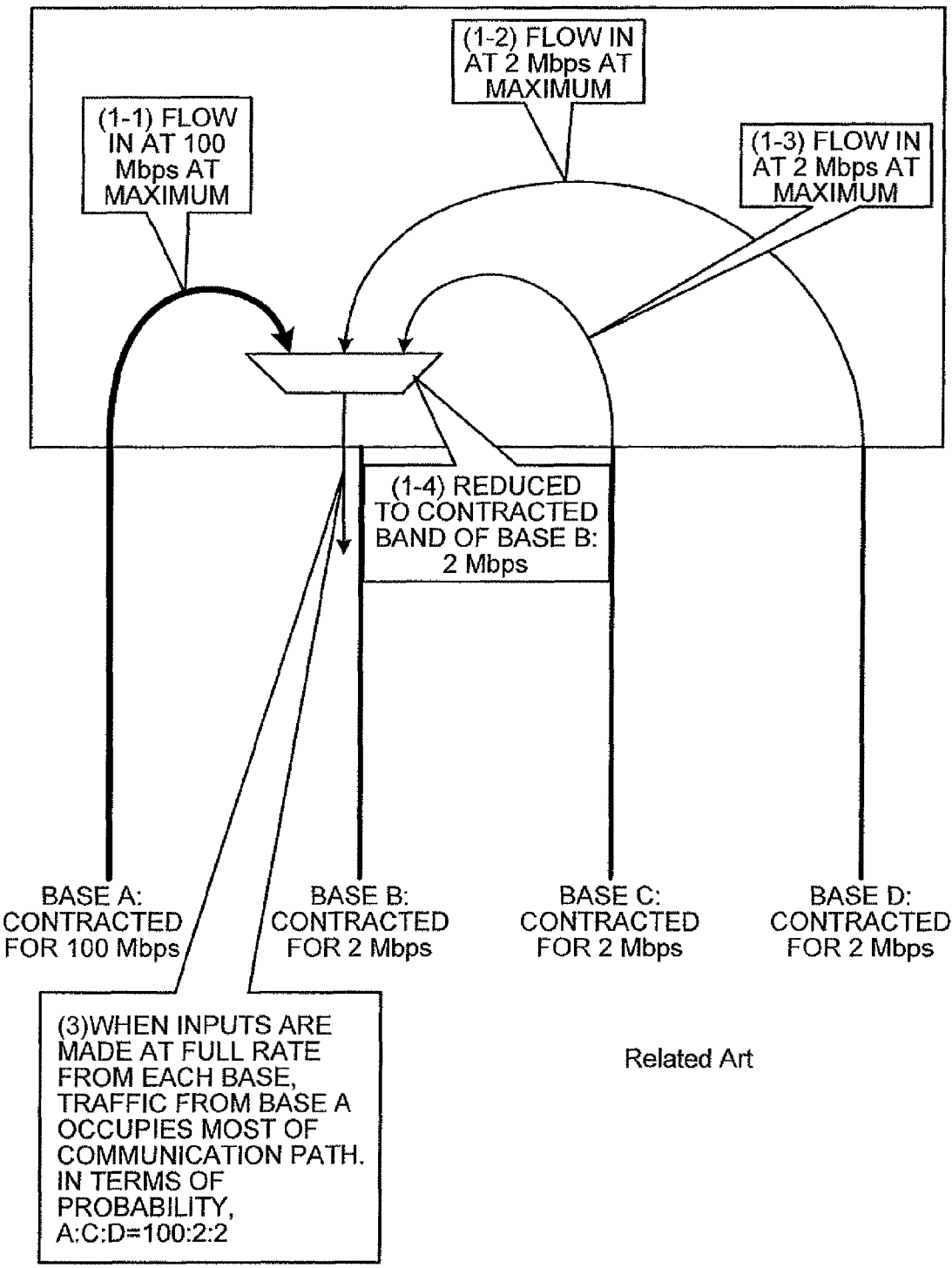
FIG. 1 is a schematic for explaining the problems in the conventional technique.

Before explaining the first and the second embodiments, problems with a conventional technique will be explained, FIG. 1 is a drawing for explaining the problems with the conventional technique. As shown in the drawing, it is assumed that a wide area network is constructed by having a base A, a base B, a base C, and a base D connected to a multipoint switching apparatus. The communication band for which a contract has been made (hereafter, "contracted communication band") with the multipoint switching apparatus for the base A is 100 megabits per second (Mbps). The contracted communication band with the multipoint switching apparatus for the base B is 2 Mbps. The contracted communication band with the multipoint switching apparatus for the base C is 2 Mbps. The contracted communication band with the multipoint switching apparatus for the base D is 2 Mbps.

Let us discuss a situation in which (1-1): traffic (packets) flows from the base A into the base B at 100 Mbps at the maximum; and at the same time, (1-2): traffic flows from the base D into the base B at 2 Mbps at the maximum; and (1-3): traffic also flows from the base C into the base B at 2 Mbps at the maximum. Even if the traffic flows into the base B from the plurality of bases at the same time like in this situation, because the contracted communication band of the base B is 2 Mbps, when the traffic is output to the base B, (1-4): the communication band for the output traffic is reduced to the contracted band of the base B, which is 2 Mbps.

As explained above, when the maximum traffic is input to the base B at the same time from each of the other bases (i.e., the base A, the base C, and the base D), the occupancy ratio among the flows of input traffic from the bases within the output traffic is determined, in terms of probability, proportional to the size of the communication bands of the bases being the input sources. More specifically, the occupancy ratio among the flows of input traffic from the bases within the output traffic to the base B is, in terms of probability, proportional to the communication bands of the flows of input traffic from the bases. Accordingly, the occupancy ratio is converged as "the communication band for the flow of input traffic from the base A": "the communication band for the flow of input traffic from the base C": "the communication band for the flow of input traffic from the base D"=100:2:2.

As explained above, in the multipoint switching apparatus, when the traffic concentrates from the plurality of bases, the occupancy ratio among the flows of input traffic from the bases within the output traffic of which the band is limited is proportional to the communication bands of the flows of the input traffic. As a result, the limited communication resource cannot be utilized equally.

Figure 2:
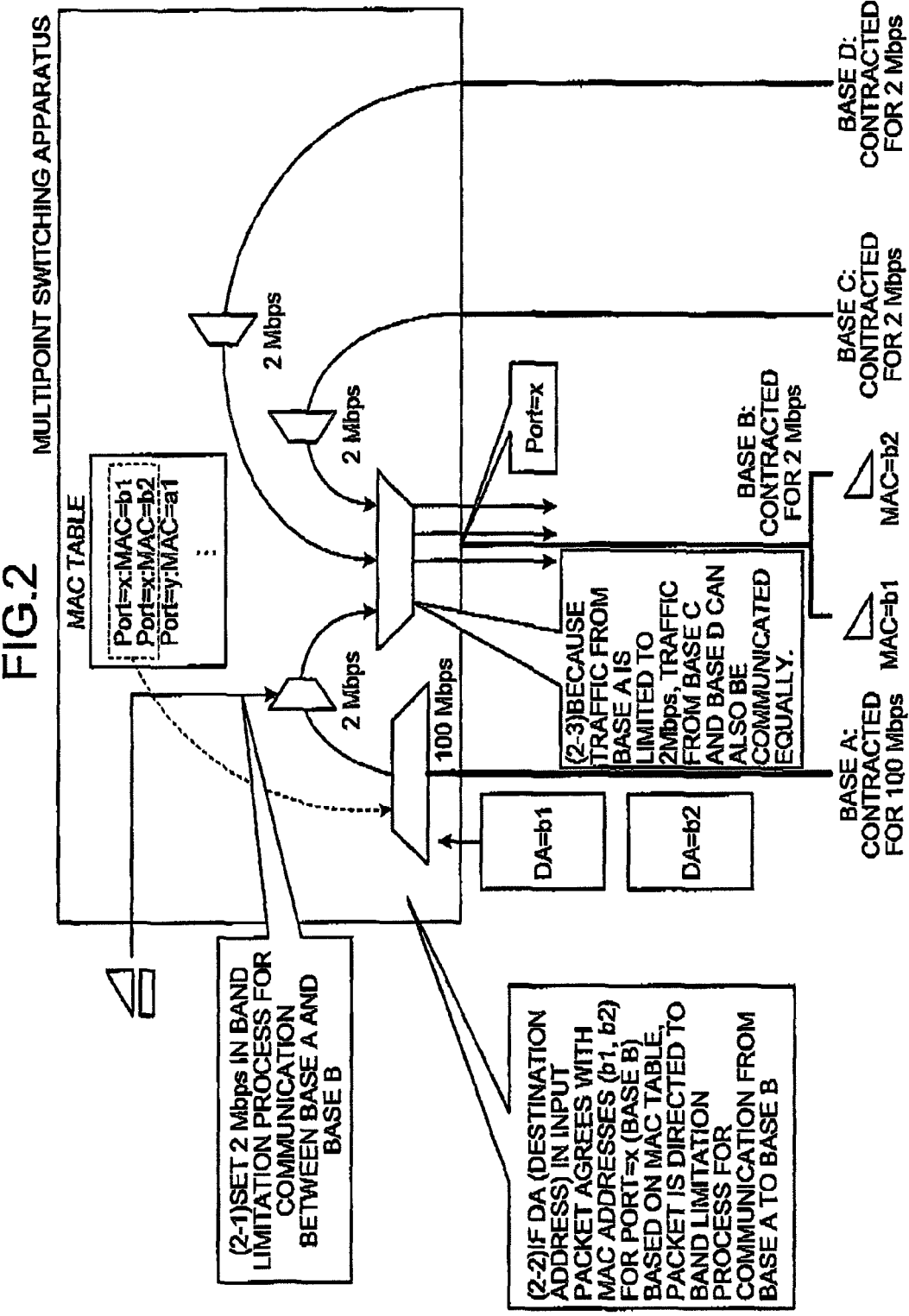
FIG. 2 is a schematic for explaining characteristics of the present invention.

To cope with this situation, as shown in FIG. 2, an arrangement has been made in the multipoint switching apparatus of the embodiments so that the occupancy ratio among the flows of input traffic from the bases within the output traffic becomes equal by placing a limitation on the bands for the traffic flowing, at the same time, from the base A to the base B, from the base C to the base B, and from base D to the base B. FIG. 2 is a drawing for explaining characteristics of the embodiments of the present invention. As shown in the drawing, (2-1): via an external input terminal, band limitation values are set in advance as "2 Mbps" to limit the band for the communication between the base A and base B, "2 Mbps" to limit the band for the communication between the base C and the base B, and "2 Mbps" to limit the band for the communication between the base D and the base B.

In this situation, a packet having destination addresses (hereinafter, "DAs") of "b1" and "b2" each of which is expressed with a Media Address Control (MAC) address is input from the base A to the multipoint switching apparatus. Subsequently, (2-2): by looking at the DAs in the input packet, it is judged that these DAs agree with the MAC addresses (i.e., b1 and b2) for "Port-x" (i.e., the base B), based on a MAC table (or a Forwarding Database [FDB]). Thus, the packet is directed to a band limitation process for the traffic flowing from the base A to the base B. When the packet is directed to the band limitation process for the traffic flowing from the base A to the base B, the band of the packet is limited according to the band limitation value that has been set in advance in the procedure (2-1) above. The bands of the packets that are input from the base C and the base D to the multipoint switching apparatus are also limited in the same fashion.

As explained above, (2-3); the traffic from the base A is limited so as to be reduced from "100 Mbps" to "2 Mbps". Consequently, the band of each of the input traffic flows that is output through "Port-x" being any port connected to the base B is equally limited to "2 Mbps" in advance. Thus, the traffic from the base C and the traffic from the base D can also be communicated equally. To summarize, as explained above, the occupancy ratio among the flows of input traffic from the bases within the output traffic is, in terms of probability, proportional to the communication bands of the flows of input traffic from the bases. Accordingly, the occupancy ratio is converged as "the communication band for the flow of input traffic from the base A": "the communication band for the flow of input traffic from the base C": "the communication band for the flow of input traffic from the base D"=2:2:2.

Figure 3:
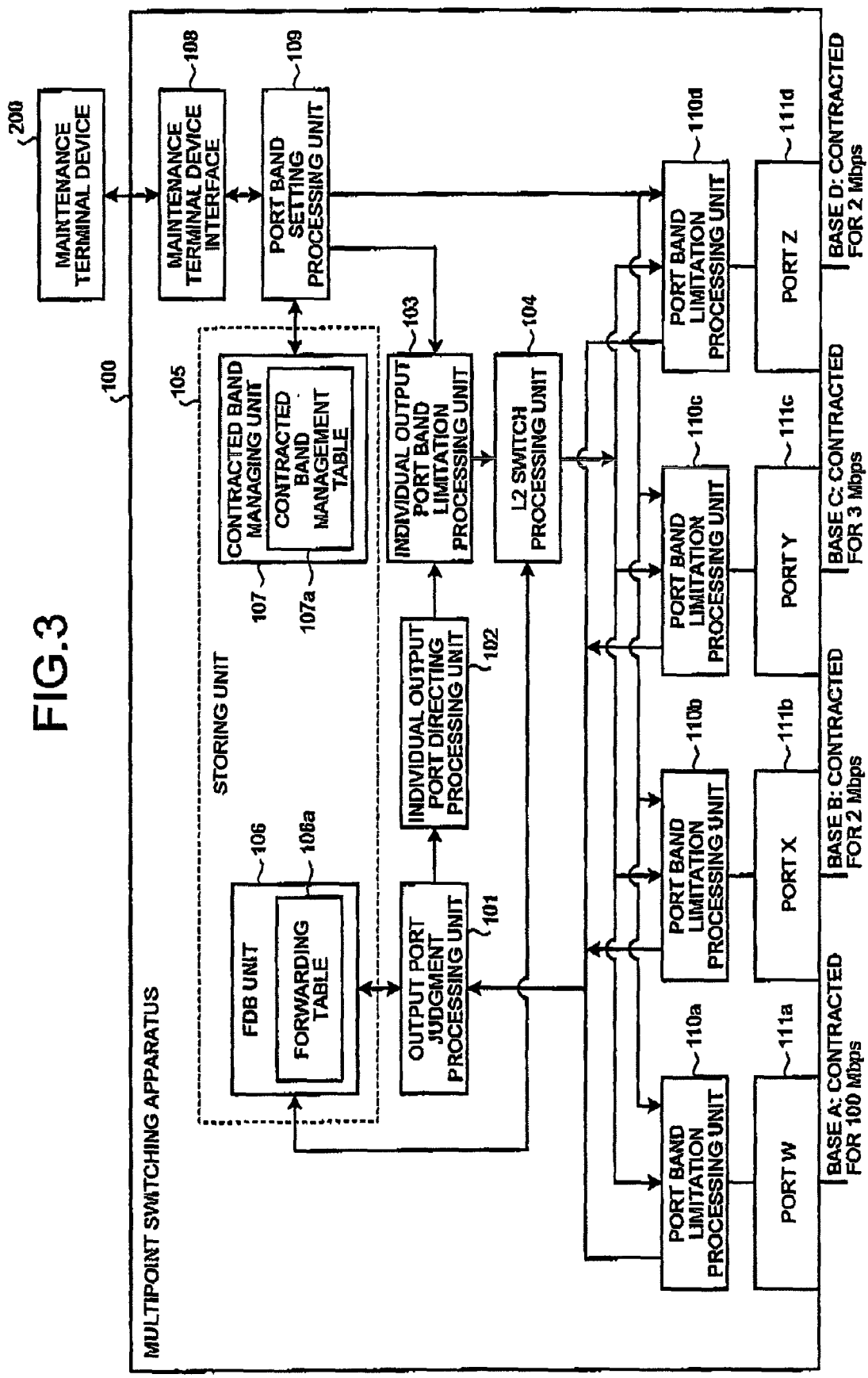
FIG. 3 is a functional block diagram of a multipoint switching apparatus according to a first embodiment of the present invention.

Next, the first embodiment of the present invention will be explained with reference to FIGS. 3 to 14. In the first embodiment, all the examples are based on an assumption that a band limitation process is performed according to a band limitation set value that is in correspondence with an input port or an output port, based on identification information of the input port or the output port for each packet. First, a multipoint switching apparatus according to the first embodiment will be explained with reference to FIGS. 3 to 6. FIG. 3 is a functional block diagram of a multipoint switching apparatus 100 according to the first embodiment.

The multipoint switching apparatus 100 includes an output port judgment processing unit 101, an individual output port directing processing unit 102, an individual output port band limitation processing unit 103, an L2 switch processing unit 104, a storing unit 105, a maintenance terminal device interface 108, a port band setting processing unit 109, a port band limitation processing unit 110a, a port band limitation processing unit 110b, a port band limitation processing unit 110c, a port band limitation processing unit 110d, a port W 111a, a port X 111b, a port Y 111c, and a port Z 111d.

The storing unit 105 further includes a Forwarding Database (FDB) unit 106 and a contracted band managing unit 107. The FDB unit 106 includes a forwarding table 106a. The contracted band managing unit 107 includes a contracted band management table 107a. Another arrangement is acceptable in which the storing unit 105 includes a MAC table, instead of the FDB unit 106 (or the forwarding table 106a).

The multipoint switching apparatus according to the first embodiment includes four ports, namely the port W 111a, the port X 111b, the port Y 111c, and the port Z 111d that are used for connecting bases with one another. However, the present invention is not limited to this example. The multipoint switching apparatus may include any arbitrary number of ports.

A maintenance terminal device 200 is connected to the multipoint switching apparatus 100 via the maintenance terminal device interface 108. The band set value for each of the ports that is input from the maintenance terminal device 200 is stored into the contracted band management table 107a included in the contracted band managing unit 107. The band set value for each of the ports is also set into a processing function corresponding to the individual output port within the individual output port band limitation processing unit 103 that has a separate processing function for each of the output ports. Also, a corresponding band set value is set into each of the port band limitation processing units 110a to 110d. In addition, a corresponding band set value is set into each of the parts W 111a to Z 111d.

According to the first embodiment, it is assumed that the contracted band for the communication with the base A is 100 Mbps; the contracted band for the communication with the base B is 2 Mbps; the contracted band for the communication with the base C is 3 Mbps; and the contracted band for the communication with the base D is 2 Mbps. Accordingly, the contracted band management table 107a stores therein data that indicates 100 Mbps for the base A; 2 Mbps for the base B; 3 Mbps for the base C; and 2 Mbps for the base D.

Within the individual output port band limitation processing unit 103, 100 Mbps is set into the processing function that corresponds to the port W 111a as the band set value; 2 Mbps is set into the processing function that corresponds to the port X 111b as the band set value; 3 Mbps is set into the processing function that corresponds to the port Y 111c as the band set value; and 2 Mbps is set into the processing function that corresponds to the port Z 111d as the band set value.

Also, 100 Mbps is set into the port band limitation processing unit 110a as the band set value; 2 Mbps is set into the port band limitation processing unit 110b as the band set value; 3 Mbps is set into the port band limitation processing unit 110c as the band set value; and 2 Mbps is set into the port band limitation processing unit 110d as the band set value.

The output port judgment processing unit 101 is a processing unit that judges to which one of the output ports, a destination base is connected, by referring to the forwarding table 106a, based on destination information (hereinafter, "DA [Destination Address]") that is contained in the header of a packet that has been input through one of the ports W 111a to Z 111d.

The individual output port directing processing unit 102 is a processing unit that directs each packet to the individual output port band limitation processing unit 103 that is provided for each of the output ports, according to the output port determined according to the judgment made by the output port judgment processing unit 101.

The individual output port band limitation processing unit 103 is a processing unit that has a separate processing function for each of the output ports and also limits the band of each input packet according to the band set value that has been set into the processing function corresponding to the individual output port.

The L2 switch processing unit 104 is a processing unit that performs a normal layer 2 switch process and directs each packet to an output port determined according to the judgment based on the address information contained in the header of the packet forwarded from the individual output port band limitation processing unit 103, by referring to the forwarding table 106a.

The FDB unit 106 included in the storing unit 105 stores identification information of the output ports in correspondence with MAC addresses, into the forwarding table 106a. The contracted band managing unit 107 included in the storing unit 105 stores the identification information of the output ports in correspondence with the contracted bands, into the contracted band management table 107a.

The maintenance terminal device interface 108 is an interface used for connecting the multipoint switching apparatus 100 to the maintenance terminal device 200. The maintenance terminal device interface 108 performs a process of forwarding information input from the maintenance terminal device 200 to the port band setting processing unit 109 and also performs a process of forwarding information that is obtained out of the contracted band management table 107a and is forwarded from the port band setting processing unit 109, to the maintenance terminal device 200 so that the information can be displayed.

The port band setting processing unit 109 forwards input information from the maintenance terminal device 200 that has been forwarded by the maintenance terminal device interface 108, to the contracted band managing unit 107. Also, the port band setting processing unit 109 forwards information that is obtained out of the contracted band management table 107a and is forwarded from the contracted band managing unit 107, to the maintenance terminal device interface 108 so that the information can be displayed on the maintenance terminal device 200.

The port band limitation processing unit 110a is a processing unit that regulates the band of each of the packets that is input and output through the port W 111a, based on the band set value that has been set. The port band limitation processing unit 110a is in correspondence with the port W 111a. The port band limitation processing unit 110a performs no band limitation process when the band of an input packet is equal to or lower than the band set value and performs a band limitation process by thinning out a packet when the band of the input packet exceeds the band set value. The port W 111a is one of the ports that are included in the multipoint switching apparatus 100 and serves as a physical contact point used in communication with external bases.

The port band limitation processing unit 110b is in correspondence with the port X 111b. The port band limitation processing unit 110c is in correspondence with the port Y 111c. The port band limitation processing unit 110d is in correspondence with the port Z 111d. These port band limitation processing units and ports operate in the same manner as the port band limitation processing unit 110a the port W 111a.

Next, the forwarding table 106a and the contracted band management table 107a that are shown in FIG. 3 will be explained. FIG. 4 depicts an example of contents of the forwarding table 106a. FIG. 5 depicts an example of contents of the contracted band management table 107a.

As shown in FIG. 4, the forwarding table 106a stores therein MAC addresses in correspondence with identification information of the output ports. By referring to the table, it is possible to search identification information of a port being an output destination of a packet, based on a MAC address that is specified as destination information contained in the header of the packet.

Also, as shown in FIG. 5, the contracted band management table 107a stores therein contracted bands in correspondence with identification information of the ports. By referring to the table, it is possible to find out the contracted band allowed for communication with each of the connected bases, based on the identification information of a corresponding one of the ports included in the multipoint switching apparatus.

Figure 6:
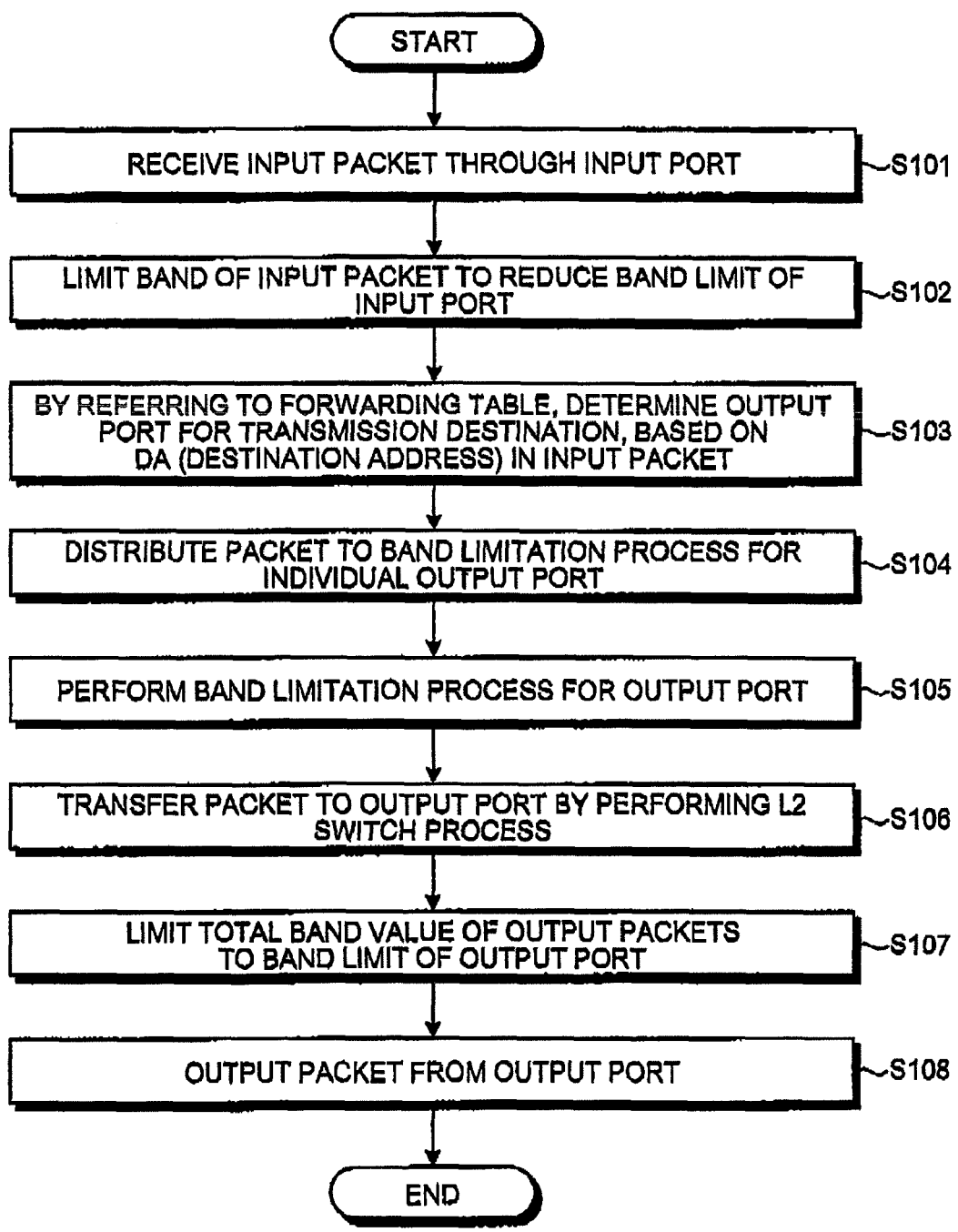
FIG. 6 is a flowchart of a band controlling process performed by the multipoint switching apparatus shown in FIG. 3.

Next, a band controlling process performed by the multipoint switching apparatus 100 will be explained. FIG. 6 is a flowchart of the band controlling process performed by the multipoint switching apparatus 100.

First, the multipoint switching apparatus 100 receives an input of a packet through one of the ports W 111a to Z 111d (step S101). Subsequently, the port band limitation processing unit (i.e., one of the port band limitation processing units 110a to 110d) that is in correspondence with the port through which the input of the packet is received at step S101 limits the band of the input packet so as to reduce it to the band set value that has been set to the port (step S102).

After that, by referring to the forwarding table 106a, the output port judgment processing unit 101 judges to which one of the output ports, the base being the transmission destination of the packet is connected, based on the DA of the input packet of which the band has been limited down to the band limit at step S102 (step S103).

Subsequently, the individual output port directing processing unit 102 directs the packet for which the output port has been determined at step S103 to one of the processing functions that is in correspondence with the output port, the corresponding processing function being provided within the individual output port band limitation processing unit 103 that has a separate processing function for each of the output ports (step S104). The one of the processing functions within the individual output port band limitation processing unit 103 that is in correspondence with the output port and to which the packet has been directed performs the band limitation process for the packet (step S105).

After that, by referring to the forwarding table 106a, the L2 switch processing unit 104 identifies the output port based on the destination information contained in the header of the packet of which the band has been limited at step S104 and performs an L2 switch process so as to transfer the packet to the identified output port (Step S106).

Subsequently, the port band limitation processing unit (i.e., one of the port band limitation processing units 110a to 110d) limits a total band for all the output packets to the band set value that has been set to the port, the port band limitation processing unit being positioned so as to be employed before the output port through which the packet of which the band has been limited at step S106 is output (step S107). After that, the multipoint switching apparatus 100 outputs the packet from the output port (step S108).

By configuring the multipoint switching apparatus 100 in this manner, it is possible to limit the band for the communication between the specific bases. Thus, even if packets are transmitted from a plurality of bases to one base through the multipoint switching apparatus 100 in a congested manner, it is possible to prevent the situation where the band between the multipoint switching apparatus 100 and the base being the transmission destination of the packets is occupied by the packet from one of the bases with a high ratio, and it is therefore possible to distribute the band among the bases equally.

Also, the band limitation process for the packet is performed on the input port side, which is positioned so as to be employed before the L2 switch process is performed. Thus, it is possible to reduce the processing load on the multipoint switching apparatus 100 at the following stages.

Figure 7:
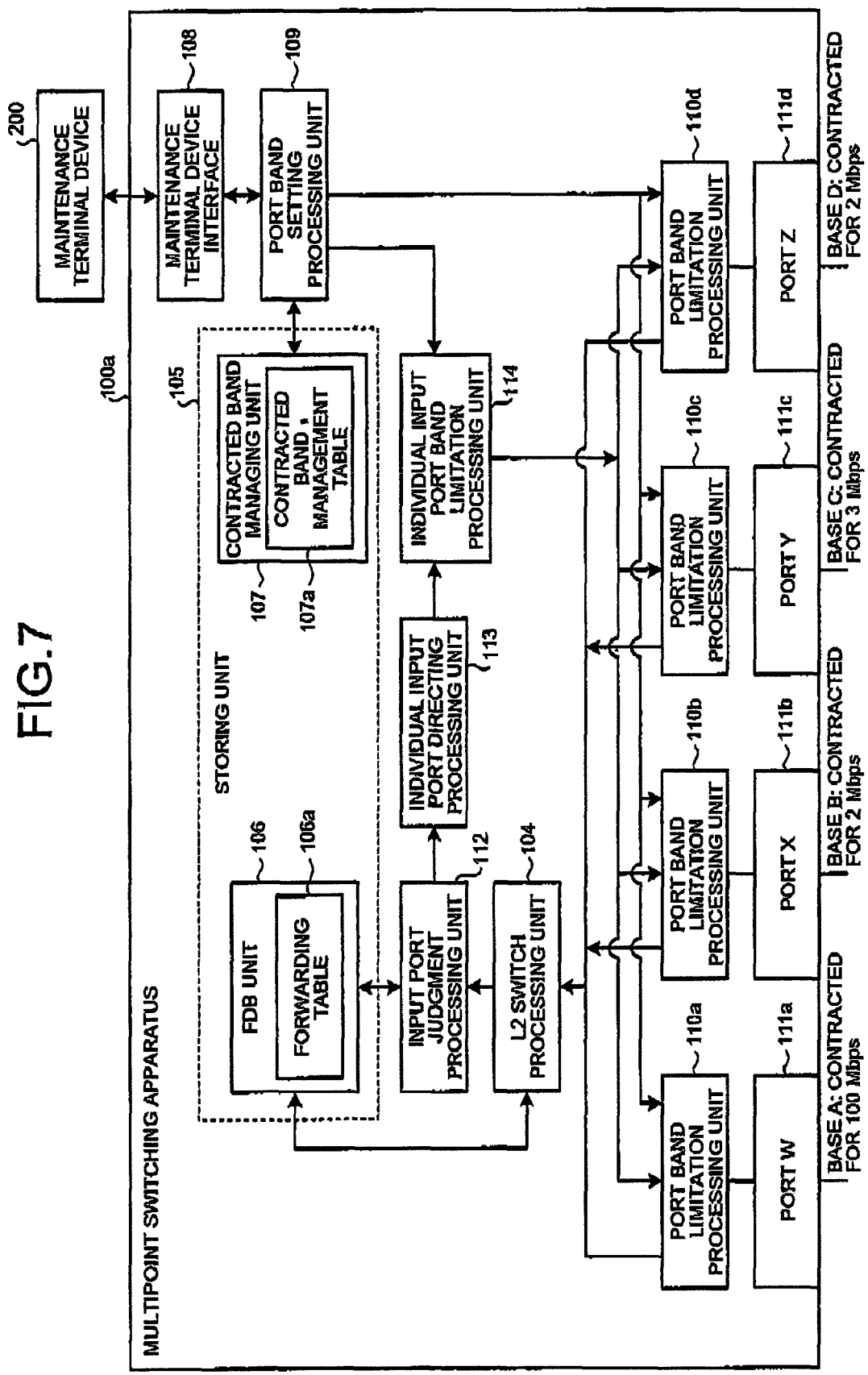
FIG. 7 is a functional block diagram of a first variant of the multipoint switching apparatus according to the first embodiment.
Figure 8:
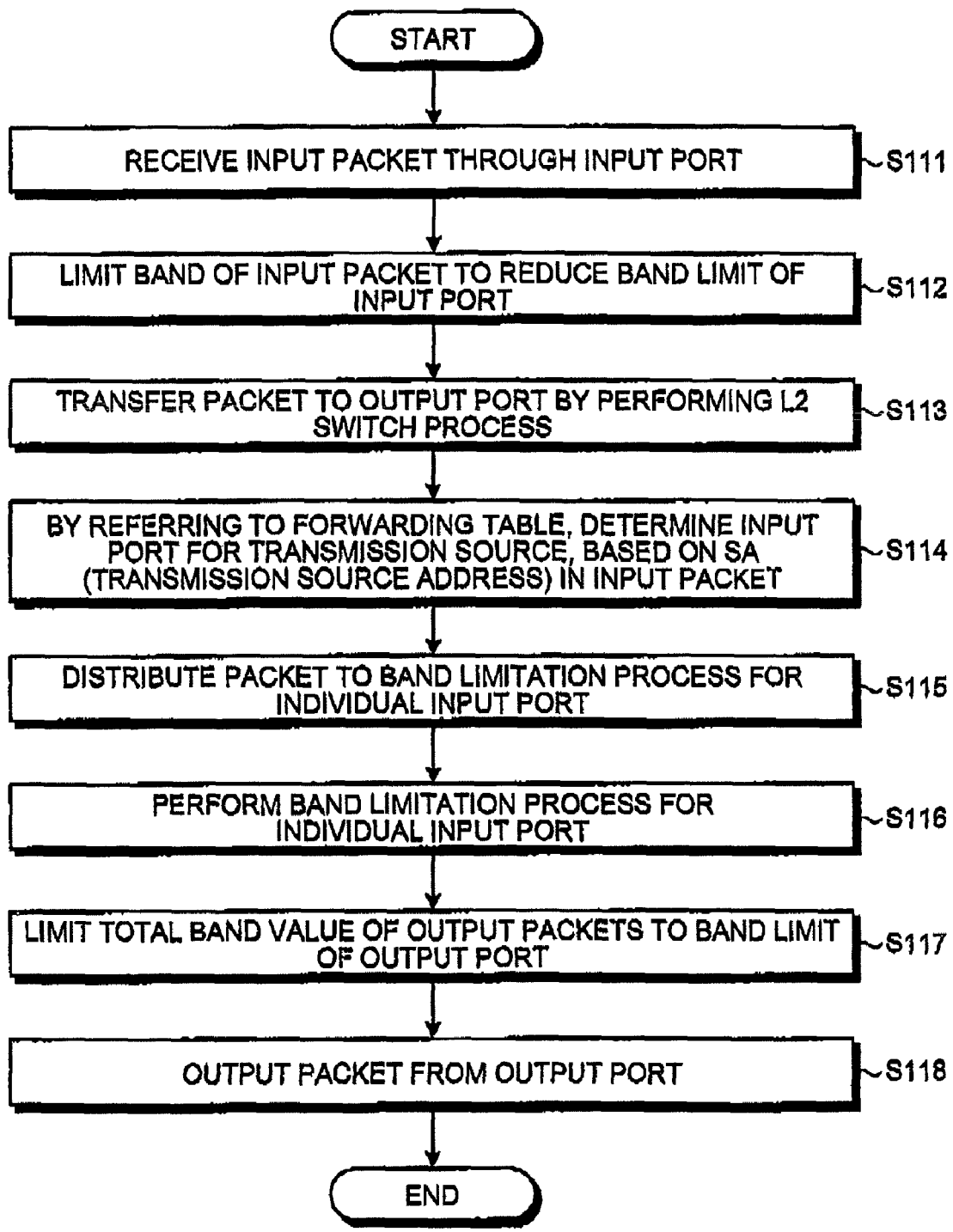
FIG. 8 is a flowchart of a band controlling process performed by the multipoint switching apparatus shown in FIG. 7.

Next, a first variant of the multipoint switching apparatus 100 will be explained below as a multipoint switching apparatus 110a with reference to FIGS. 7 and 8. FIG. 7 is a functional block diagram of the multipoint switching apparatus 110a.

The multipoint switching apparatus 100a includes the L2 switch processing unit 104, an input port judgment processing unit 112, an individual input port directing processing unit 113, an individual input port band limitation processing unit 114, the storing unit 105 (that includes the FDB unit 106 and the contracted band managing unit 107), the maintenance terminal device interface 108, the port band setting processing unit 109, the port band limitation processing unit 110a, the port band limitation processing unit 110b, the port band limitation processing unit 110c, the port band limitation processing unit 110d, the port W 111a, the port X 111b, the port Y 111c, and the port Z 111d.

The storing unit 105, the maintenance terminal device interface 108, the port band setting processing unit 109, the port band limitation processing unit 110a, the port band limitation processing unit 110b, the port band limitation processing unit 110c, the port band limitation processing unit 110d, the port W 111a, the port X 111b, the port Y 111c, and the port Z 111d have the same processing functions as those of the functional blocks that are shown in FIG. 3 and have the same names. Thus, the explanation thereof will be omitted. Likewise, the explanation of the processing functions of the functional blocks that are the same as the ones shown in FIG. 3 as well as the limitations that are placed and the limitations that are removed will be omitted.

Like in FIG. 3, the contracted band for the communication with the base A is 100 Mbps; the contracted band for the communication with the base B is 2 Mbps; the contracted band for the communication with the base C is 3 Mbps; and the contracted band for the communication with the base D is 2 Mbps. Accordingly, within the individual input port band limitation processing unit 114, 100 Mbps is set into the processing function that corresponds to the port W 111a as the band set value; 2 Mbps is set into the processing function that corresponds to the port X 111b as the band set value; 3 Mbps is set into the processing function that corresponds to the port Y 111c as the band set value; and 2 Mbps is set into the processing function that corresponds to the port Z 111d as the band set value.

More specifically, like the multipoint switching apparatus 100 shown in FIG. 3, the multipoint switching apparatus 100a has the maintenance terminal device 200 connected thereto, via the maintenance terminal device interface 108. The band set value for each of the ports that is input from the maintenance terminal device 200 is stored into the contracted band management table 107a included in the contracted band managing unit 107. The band set value for each of the ports is also set into a processing function corresponding to the individual input port within the individual input port band limitation processing unit 114 that has a separate processing function for each of the input ports. Also, a corresponding band set value is set into each of the port band limitation processing units 110a to 110d. In addition, a corresponding band set value is set into each of the ports W 111a to Z 111d.

The L2 switch processing unit 104 is a processing unit that performs a normal layer 2 switch process and directs each packet to an output port determined according to a judgment based on the address information contained in the header of the packet forwarded from the port band limitation processing unit (i.e., one of the port band limitation processing units 110a to 110d), by referring to the forwarding table 106a. It should be noted, however, that the packet is forwarded to the input port judgment processing unit 112 before the packet is directed to the output port, because the functional block that performs the band limitation process is positioned so as to be employed after the L2 switch process is performed, according to the configuration of the multipoint switching apparatus shown in FIG. 7.

The input port judgment processing unit 112 is a processing unit that judges to which one of the input ports, the base being the transmission source is connected, by referring to the forwarding table 106a, based on transmission source information (hereinafter, SA [Source Address]) contained in the header of the packet forwarded from the L2 switch processing unit 104.

The individual input port directing processing unit 113 is a processing unit that directs each packet to the individual input port band limitation processing unit 114 that is provided for each of the input ports, according to the input port determined according to the judgment made by the input port judgment processing unit 112.

The individual input port band limitation processing unit 114 is a processing unit that has a separate processing function for each of the input ports and also limits the band of each input packet according to the band set value that has been set into the processing function corresponding to the individual output port.

Next, a band controlling process performed by the multipoint switching apparatus 100a will be explained. FIG. 8 is a flowchart of the band controlling process performed by the multipoint switching apparatus 100a.

First, the multipoint switching apparatus 110a receives an input of a packet through one of the ports W 111a to Z 111d (step S111). Subsequently, the port band limitation processing unit (i.e., one of the port band limitation processing units 110a to 110d) that is in correspondence with the port through which the input of the packet is received at step S111 limits the band of the input packet so as to reduce it to the band set value that has been set to the port (step S112).

After that, by referring to the forwarding table 106a, the L2 switch processing unit 104 identifies an output port, based on the destination information contained in the header of the packet of which the band has been limited at step S112 and performs the L2 switch process so as to transfer the packet to the identified output port (step S113).

Subsequently, by referring to the forwarding table 106a, the input port judgment processing unit 112 judges to which one of the input ports, the base being the transmission source from which the packet has been input is connected, based on the SA contained in the packet that has been transferred at step S113 (step S114).

After that, the individual input port directing processing unit 113 directs the packet for which the input port has been determined at step S114 to one of the processing functions that is in correspondence with the input port and is within the individual input port band limitation processing unit 114 that has a separate processing function for each of the input ports (step S115). The processing function within the individual input port band limitation processing unit 114 that is in correspondence with the input port and to which the packet has been directed performs the band limitation process for the packet (step S116).

Subsequently, the port band limitation processing unit (i.e., one of the port band limitation processing units 110a to 110d) limits a total band for all the output packets to the band set value that has been set to the port, the port band limitation processing unit being positioned so as to be employed before the output port through which the packet of which the band has been limited at step S116 is output (step S117). After that, the multipoint switching apparatus 100a outputs the packet from the output port (step S118).

By configuring the multipoint switching apparatus 100a in this manner, it is possible to limit the band for the communication between the specific bases. Thus, even if packets are transmitted from a plurality of bases to one base through the multipoint switching apparatus 100a in a congested manner, it is possible to prevent the situation where the band between the multipoint switching apparatus 100a and the base being the transmission destination of the packets is occupied by the packet from one of the bases with a high ratio, and it is therefore possible to distribute the band among the bases equally.

Also, the band limitation process for the packet is performed on the output port side that is positioned so as to be employed after the L2 switch process is performed, based on the SA contained in the packet. Thus, it is possible to limit the band of a packet of which the DA is unidentified (i.e., a multicast packet, a broadcast packet, or the like) and a packet of which the DA has not been brought into correspondence with any output destination port (i.e., an unknown unicast packet). Consequently, it is possible to control the communication band between the bases more strictly.

Figure 9:
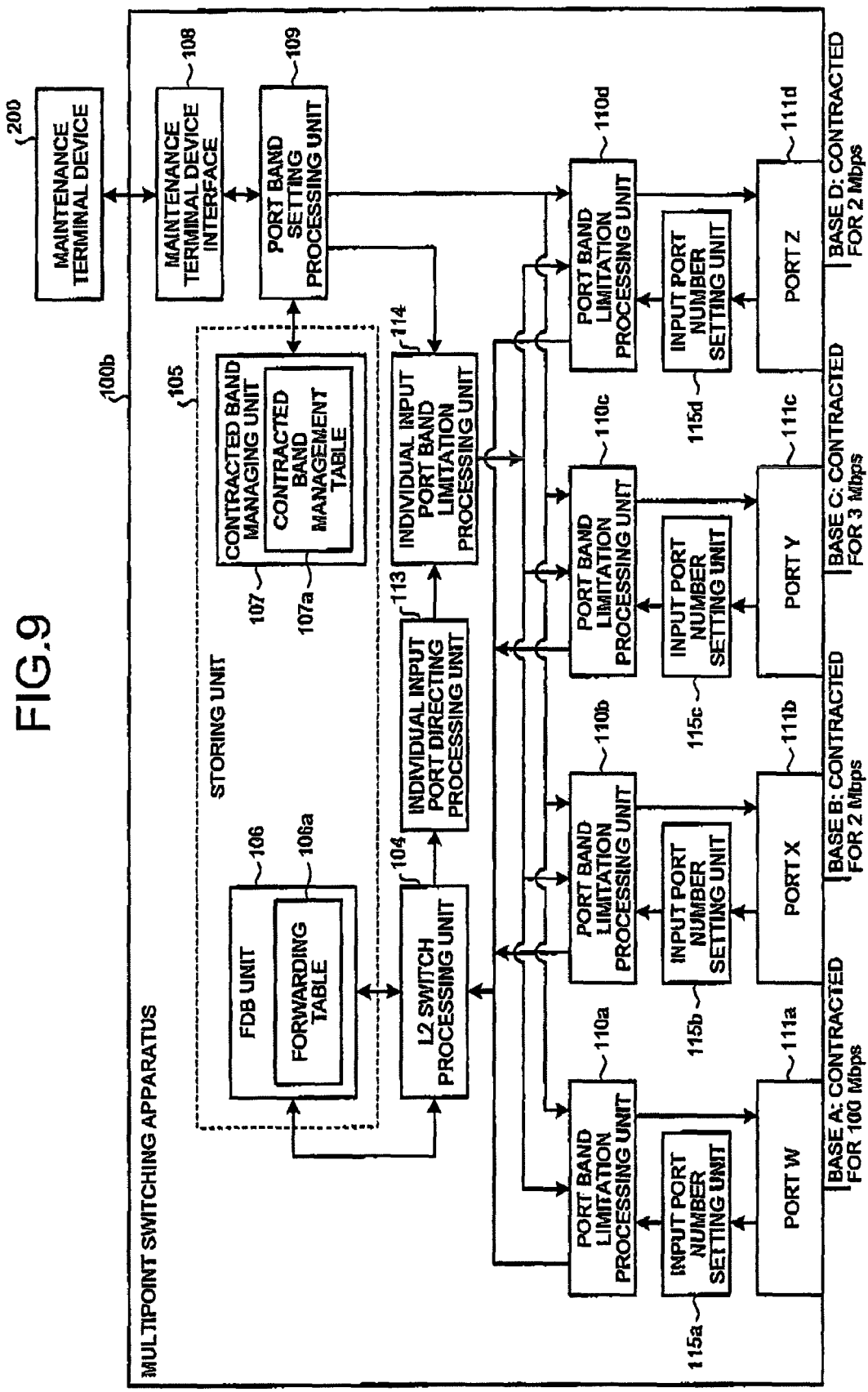
FIG. 9 is a functional block diagram or a second variant of the multipoint switching apparatus according to the first embodiment.
Figure 10:
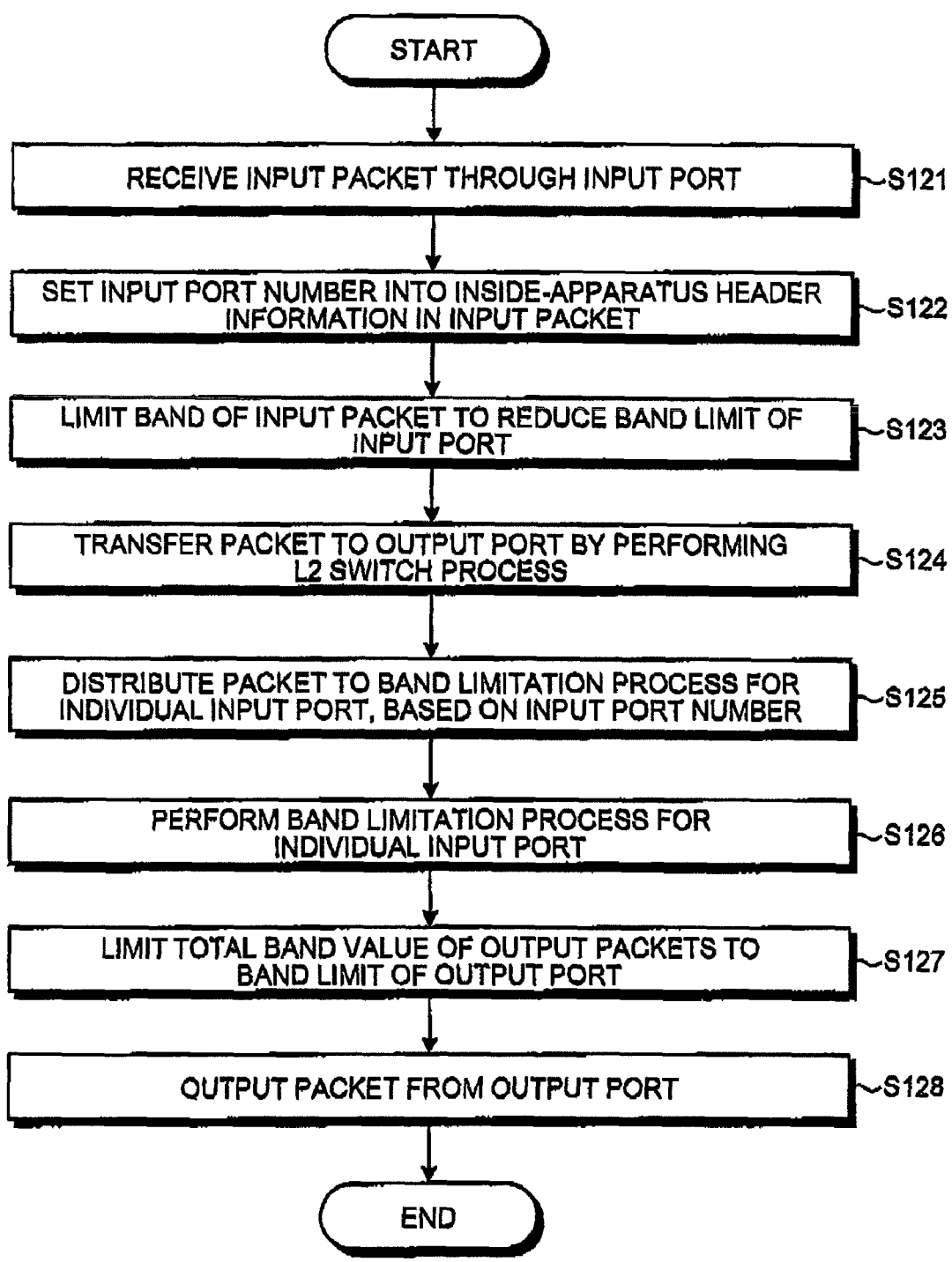
FIG. 10 is a flowchart of a band controlling process performed by the multipoint switching apparatus shown in FIG. 9.

Next, a second variant of the multipoint switching apparatus 100 will be explained below as a multipoint switching apparatus 100b with reference to FIGS. 9 and 10. FIG. 9 is a functional block diagram of the multipoint switching apparatus 100b.

The multipoint switching apparatus 100b includes the L2 switch processing unit 104, the individual input port directing processing unit 113, the individual input port band limitation processing unit 114, the storing unit 105 (that includes the FDB unit 106 and the contracted band managing unit 107), the maintenance terminal device interface 108, the port band setting processing unit 109, the port band limitation processing unit 110a, the port band limitation processing unit 110b, the port band limitation processing unit 110c, the port band limitation processing unit 110d, the port W 111a, the port X 111b, the port Y 111c, the port Z 111d, an input port number setting unit 115a, an input port number setting unit 115b, an input port number setting unit 115c, and an input port number setting unit 115d.

The storing unit 105, the maintenance terminal device interface 108, the port band setting processing unit 109, the port band limitation processing unit 110a, the port band limitation processing unit 110b, the port band limitation processing unit 110c, the port band limitation processing unit 110d, the port W 111a, the port X 111b, the port Y 111c, and the port Z 111d have the same processing functions as those of the functional blocks that are shown in FIG. 3 or FIG. 7 and have the same names. Thus, the explanation thereof will be omitted. Likewise, the explanation of the processing functions of the functional blocks that are the same as the ones shown in FIG. 3 or FIG. 7 as well as the limitations that are placed and the limitations that are removed will be omitted.

The input port number setting unit 115a is a processing unit that sets information for identifying the port W 111a into an inside-apparatus header (i.e., header information used within the multipoint switching apparatus 100b) of a packet forwarded from the port W 111a. Likewise, the input port number setting unit 115b is a processing unit that sets information for identifying the port X 111b into an inside-apparatus header of a packet forwarded from the port X 111b. The input port number setting unit 115c is a processing unit that sets information for identifying the port Y 111c into an inside-apparatus header of a packet forwarded from the port Y 111c. The input port number setting unit 115d is a processing unit that sets information for identifying the port Z 111d into an inside-apparatus header of a packet forwarded from the port Z 111d.

The packet to which the identification information of an input port has been appended by a corresponding one of the input port number setting units is forwarded from the input port number setting unit 115a to the port band limitation processing unit 110a; from the input port number setting unit 115b to the port band limitation processing unit 110b; from the input port number setting unit 115c to the port band limitation processing unit 110c; or from the input port number setting unit 115d to the port band limitation processing unit 110d.

The L2 switch processing unit 104 is a processing unit that performs a normal layer 2 switch process and directs each packet to an output port determined according to a judgment based on the address information contained in the header of the packet forwarded from the port band limitation processing unit (i.e., one of the port band limitation processing units 110a to 110d), by referring to the forwarding table 106a. It should be noted, however, that the packet is forwarded to the individual input port directing processing unit 113 before the packet is directed to the output port, because the functional block that performs the band limitation process is positioned so as to be employed after the L2 switch process is performed, according to the configuration of the multipoint switching apparatus shown in FIG. 7.

Next, a band controlling process performed by the multipoint switching apparatus 110b will be explained. FIG. 10 is a flowchart of the band controlling process performed by the multipoint switching apparatus 110b.

First, the multipoint switching apparatus 100b receives an input of a packet through one of the ports W 111a to Z 111d (step S121). Subsequently, an input port number that is identification information of the input port is set into the inside-apparatus header information contained in the packet (step S122).

After that, the port band limitation processing unit (i.e., one of the port band limitation processing units 110a to 110d) that is in correspondence with the port through which the input of the packet is received at step S121 limits the band of the input packet so as to reduce it to the band set value that has been set to the port (step S123).

Subsequently, by referring to the forwarding table 106a, the L2 switch processing unit 104 identifies an output port, based on the destination information contained in the header of the packet of which the band has been limited at step S123 and performs the L2 switch process so as to transfer the packet to the identified output port (step S124).

After that, the individual input port directing processing unit 113 directs the packet in which the input port number has been set within the inside-apparatus header at step S122 to one of the processing functions that is in correspondence with the input port and is within the individual input port band limitation processing unit 114 that has a separate processing function for each of the input ports (step S125). The processing function within the individual input port band limitation processing unit 114 that is in correspondence with the input port and to which the packet has been directed performs the band limitation process for the packet (step S126).

Subsequently, the port band limitation processing unit (i.e., one of the port band limitation processing units 110a to 110d) limits a total band for all the output packets to the band set value that has been set to the port, the port band limitation processing unit being positioned so as to be employed before the output port through which the packet of which the band has been limited at step S126 is output (step S127). After that, the multipoint switching apparatus 100b outputs the packet from the output port (step S128).

By configuring the multipoint switching apparatus 100b in this manner, it is possible to limit the band for the communication between the specific bases. Thus, even if packets are transmitted from a plurality of bases to one base through the multipoint switching apparatus 100b in a congested manner, it is possible to prevent the situation where the band between the multipoint switching apparatus 100b and the base being the transmission destination of the packets is occupied by the packet from one of the bases with a high ratio, and it is therefore possible to distribute the band among the bases equally.

In addition, when the band limitation process for the packet is performed, it is not necessary to perform the searching process for the correspondence relationship of input ports by referring to the forwarding table 106a based on the SA. Thus, it is possible to perform the band limitation process appropriately, even if information of the packet has not yet been included in the forwarding table because the rate of the packet is too high and exceeds the learning capability of the forwarding table 106a.

Figure 11:
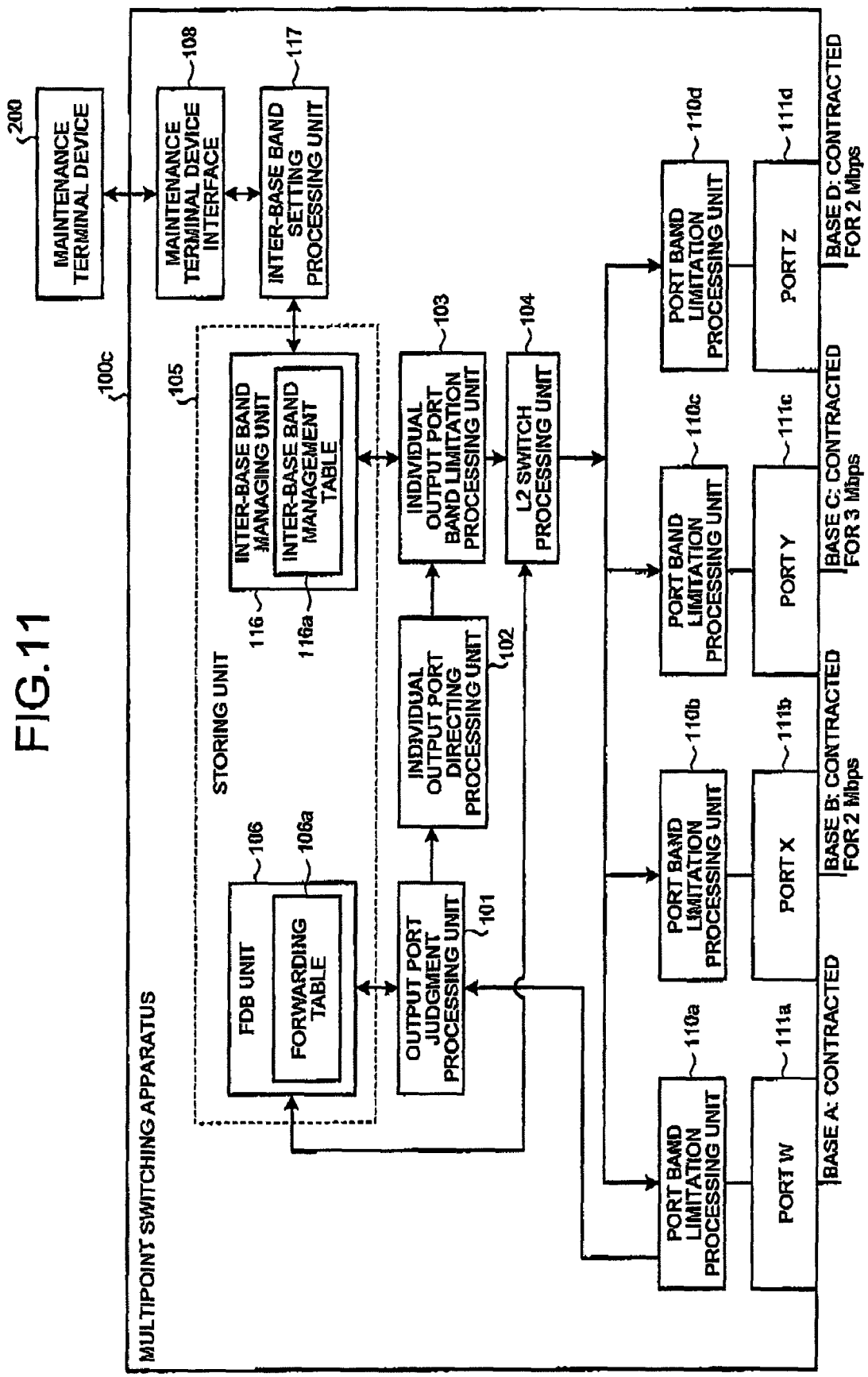
FIG. 11 is a functional block diagram of a third variant of the multipoint switching apparatus according to the first embodiment.

Next, a third variant of the configuration for the multipoint switching apparatus 100 will be explained below as a multipoint switching apparatus 100c with reference to FIGS. 11 and 12. FIG. 11 is a functional block diagram of the multipoint switching apparatus 100c.

The multipoint switching apparatus 100c includes the output port judgment processing unit 101, the individual output port directing processing unit 102, the individual output port band limitation processing unit 103, the L2 switch processing unit 104, the storing unit 105 (that includes the FDB unit 106), the maintenance terminal device interface 108, an inter-base band setting processing unit 117, the port band limitation processing unit 110a, the port band limitation processing unit 110b, the port band limitation processing unit 110c, the port band limitation processing unit 110d, the port W 111a, the port X 111b, the port Y 111c, and the port Z 111d. The inter-base band setting processing unit 117 sends input information received from the maintenance terminal device interface 108, which in turn is received from the maintenance terminal device 200, to an inter-base band managing unit 116. Moreover, the inter-base band setting processing unit 117 sends input information received from an inter-base band management table 116a included in the maintenance terminal device interface 108 to the maintenance terminal device interface 108 so that the information is displayed on the maintenance terminal device 200.

The output port judgment processing unit 101, the individual output port directing processing unit 102, the maintenance terminal device interface 108, the port band limitation processing unit 110a, the port band limitation processing unit 110b, the port band limitation processing unit 110c, the port band limitation processing unit 110d, the port W 111a, the port X 111b, the port Y 111c, and the port Z 111d have the same processing functions as those of the functional blocks that are shown in FIG. 3, FIG. 7, or FIG. 9 and have the same names. Thus, the explanation thereof will be omitted. Likewise, the explanation of the processing functions of the functional blocks that are the same as the ones shown in FIG. 3, FIG. 7, or FIG. 9 as well as the limitations that are placed and the limitations that are removed will be omitted.

Like the multipoint switching apparatuses 100, 100a, or 100b shown in FIG. 3, FIG. 7, or FIG. 9, the multipoint switching apparatus 100c has the maintenance terminal device 200 connected thereto, via the maintenance terminal device interface 108. The band set value specified for communication between each combination of bases (i.e., inter-base band) that is input from the maintenance terminal device 200 is stored into an inter-base band management table 116a included in an inter-base band managing unit 116. More specifically, the band set value for each combination of bases (i.e., inter-base band) is specified in correspondence with the combination of an input port and an output port.

Although not shown in the drawing, needless to say, like in the multipoint switching apparatuses 100, 100a, or 100b shown in FIG. 3, FIG. 7, or FIG. 9, in the multipoint switching apparatus 100c, the band set value for each of the ports that is input from the maintenance terminal device 200 is stored into the inter-base band management table 116a included in the inter-base band managing unit 116. The band set value for each of the ports is also set into a processing function corresponding to the individual output port within the individual output port band limitation processing unit 103 that has a separate processing function for each of the output ports. Also, a corresponding band set value is set into each of the port band limitation processing units 110a to 110d. In addition, a corresponding band set value is set into each of the ports W 111a to Z 111d.

The individual output port band limitation processing unit 103 is a processing unit that has a separate processing function for each of the output ports and also limits the band of each input packet according to the band set value that has been set in correspondence with each combination of an input port and an output port, by referring to the inter-base management table 116a included in the inter-base band managing unit 116, which is described later.

In the multipoint switching apparatus 100c shown in FIG. 11, the output port judgment processing unit 101, the individual output port directing processing unit 102, and the individual output port band limitation processing unit 103 are provided for each of the ports. Thus, the input port is apparent, without having to perform the input port judgment process, before the individual output port band limitation processing unit 103 obtains a band set value by referring to the inter-base band management table 116a, based on the combination of the input port and the output port. Similarly, although not shown in the drawing, the output port judgment processing unit 101, the individual output port directing processing unit 102, and the individual output port band limitation processing unit 103 are provided also for each of the ports other than the port W 111a.

The inter-base band managing unit 116 included in the storing unit 105 stores each combination of an input port and an output port in correspondence with a band limit that serves as the band set value into the inter-base band managing table 116a.

Next, the inter-base band management table 116a shown in FIG. 11 will be explained. FIG. 12 is a drawing for explaining the inter-base band management table 116a shown in FIG. 11. As shown in the drawing, the inter-base band management table 116a stores therein band limits in correspondence with combinations each made up of identification information of an input port and identification information of an output port. By referring to the inter-base band management table 116a, it is possible to obtain the band limitation value of a packet at a stage before the output port, based on the combination of the identification information of the input port and the identification information of the output port.

By configuring the multipoint switching apparatus 100c in this manner, it is possible to limit the band for the communication between the specific bases. Thus, even if packets are transmitted from a plurality of bases to one base through the multipoint switching apparatus 100c in a congested manner, it is possible to prevent the situation where the band between the multipoint switching apparatus 100c and the base being the transmission destination of the packets is occupied by the packet from one of the bases with a high ratio, and it is therefore possible to distribute the band among the bases equally.

In addition, because it is possible to set a band limit individually for each combination of bases, it is possible to perform the band limitation process in a finely-tuned manner.

Figure 13:
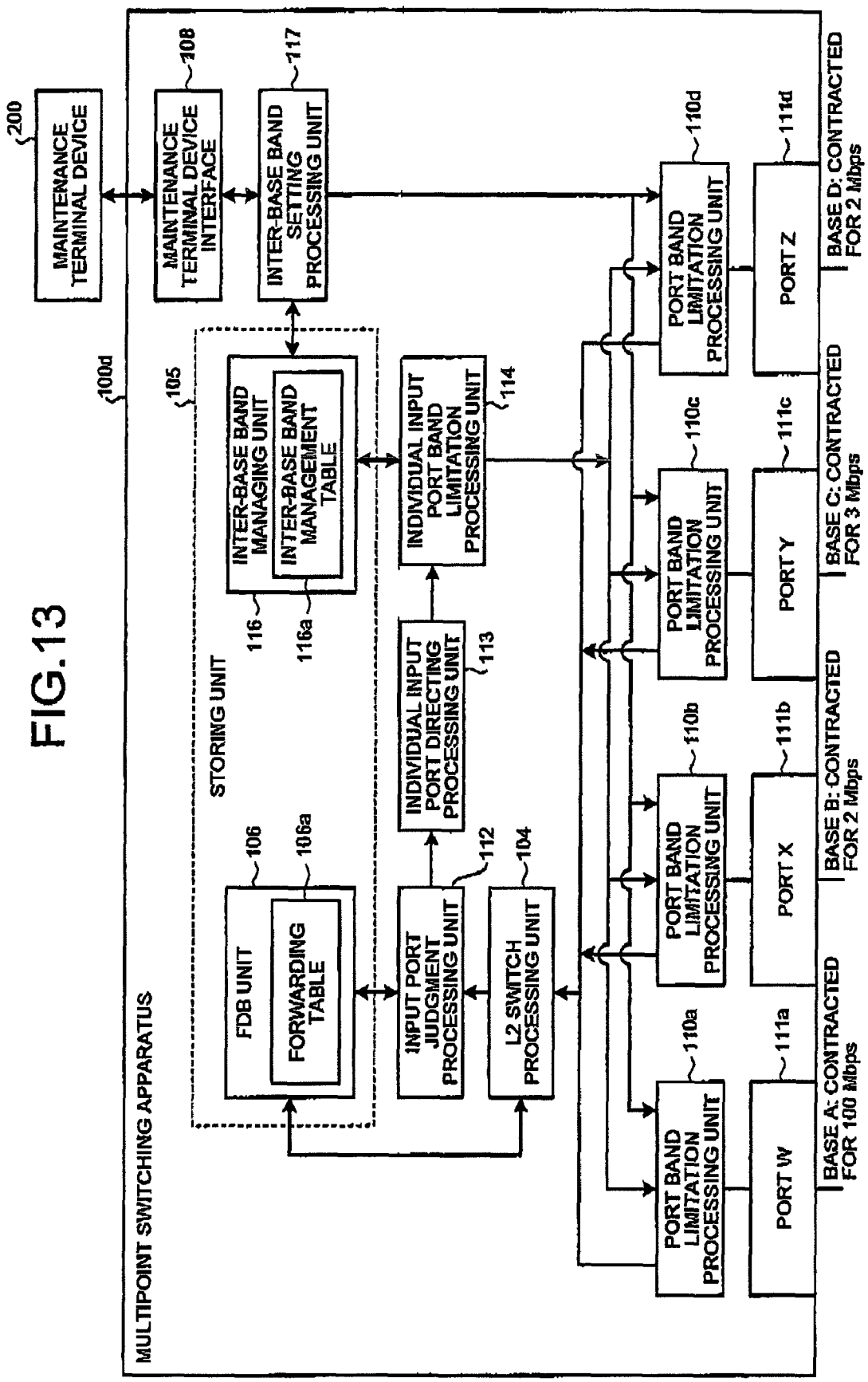
FIG. 13 is a functional block diagram of a fourth variant of the multipoint switching apparatus according to the first embodiment.

Next, a fourth variant of the multipoint switching apparatus 100 will be explained below as a multipoint switching apparatus 100d with reference to FIG. 13. FIG. 13 is a functional block diagram of the multipoint switching apparatus 100d.

The multipoint switching apparatus 100d includes the L2 switch processing unit 104, the input port judgment processing unit 112, the individual input port directing processing unit 113, the individual input port band limitation processing unit 114, the storing unit 105 (that includes the FDB unit 106 and the inter-base band managing unit 116), the maintenance terminal device interface 108, the inter-base band setting processing unit 117, the port band limitation processing unit 110a, the port band limitation processing unit 110b, the port band limitation processing unit 110c, the port band limitation processing unit 110d, the port W 111a, the port X 111b, the port Y 111c, and the port Z 111d.

The L2 switch processing unit 104, the input port judgment processing unit 112, the individual input port directing processing unit 113, the individual input port band limitation processing unit 114, the maintenance terminal device interface 108, the inter-base band setting processing unit 117, the port band limitation processing unit 110a, the port band limitation processing unit 110b, the port band limitation processing unit 110c, the port band limitation processing unit 110d, the port W 111a, the port X 111b, the port Y 111c, and the port Z 111d have the same processing functions as those of the functional blocks that are shown in FIG. 3, FIG. 7, FIG. 9, or FIG. 11 and have the same names. Thus, the explanation thereof will be omitted. Likewise, the explanation of the processing functions of the functional blocks that are the same as the ones shown in FIG. 3, FIG. 7, FIG. 9, or FIG. 11 as well as the limitations that are placed and the limitations that are removed will be omitted.

Like the other multipoint switching apparatuses shown in FIG. 3, FIG. 7, FIG. 9, or FIG. 11, the multipoint switching apparatus 100d has the maintenance terminal device 200 connected thereto, via the maintenance terminal device interface 108. The band set value for each combination of bases (i.e., inter-base band) that is input from the maintenance terminal device 200 is stored into the inter-base band management table 116a included in the inter-base band managing unit 116. More specifically, the band set value for each combination of bases (i.e., inter-base band) is specified in correspondence with the combination of an input port and an output port.

Although not shown in the drawing, needless to say, like in the other multipoint switching apparatuses shown in FIG. 3, FIG. 7, FIG. 9, or FIG. 11, in the multipoint switching apparatus 100d, the band set value for each of the ports that is input from the maintenance terminal device 200 is stored into the inter-base band management table 116a included in the inter-base band managing unit 116. The band set value for each of the ports is also set into a processing function corresponding to the individual input port within the individual input port band limitation processing unit 114 that has a separate processing function for each of the input ports. Also, a corresponding band set value is set into each of the port band limitation processing units 110a to 110d. In addition, a corresponding band set value is set into each of the ports W 111a to Z 111d.

The multipoint switching apparatus 100d includes the inter-base band managing unit 116 and the inter-base band management table 116a, instead of the contracted band managing unit 107 and the contracted band management table 107a that are included in the multipoint switching apparatus 100a shown in FIG. 7, and also includes the inter-base band setting processing unit 117 instead of the port band setting processing unit 109. Thus, the process performed by the multipoint switching apparatus 100a shown in FIG. 7 is the same as the process performed by the multipoint switching apparatus 100d shown in FIG. 13, except that, in the multipoint switching apparatus 100d shown in FIG. 13, the individual input port band limitation processing unit 114 performs the band limitation process for a packet according to the band limitation value stored for each combination of an input port and an output port in the inter-base band management table 116a, whereas the multipoint switching apparatus 100a shown in FIG. 7 performs the band limitation process for a packet according to the band limitation value that has been set by the port band setting processing unit 109.

In other words, by configuring the multipoint switching apparatus 100d in this manner, the packet that has been input through one of the ports W 111a to Z 111d is, at first, transferred to an output port determined based on the DA contained in the header, by performing an L2 switch process. Subsequently, before being output from the output port, the packet is directed to one of the processing functions within the band limitation processing unit that is in correspondence with the input port determined based on the SA contained in the header. After that, the processing function within the band limitation processing unit to which the packet has been directed performs the band limitation process for the packet according to the band limitation value obtained based on the combination of the input port and the output port, by referring to the inter-base band management table 116a.

By configuring the multipoint switching apparatus 100d in this manner, it is possible to limit the band for the communication between the specific bases. Thus, even if packets are transmitted from a plurality of bases to one base through the multipoint switching apparatus 100d in a congested manner, it is possible to prevent the situation where the band between the multipoint switching apparatus 100d and the base being the transmission destination of the packets is occupied by the packet from one of the bases with a high ratio, and it is therefore possible to distribute the band among the bases equally.

In addition, because it is possible to set a band limit individually for each combination of bases, it is possible to perform the band limitation process in a finely-tuned manner. Further, the band limitation process for the packet is performed on the output port side that is positioned so as to be employed after the L2 switch process is performed, based on the SA contained in the packet. Thus, it is possible to limit the band of a packet in which the DA is unidentified (i.e., a multicast packet, a broadcast packet, or the like) and of a packet of which the DA has not been brought into correspondence with any output destination port (i.e., an unknown unicast packet). Consequently, it is possible to control the communication band between the bases more strictly.

Figure 14:
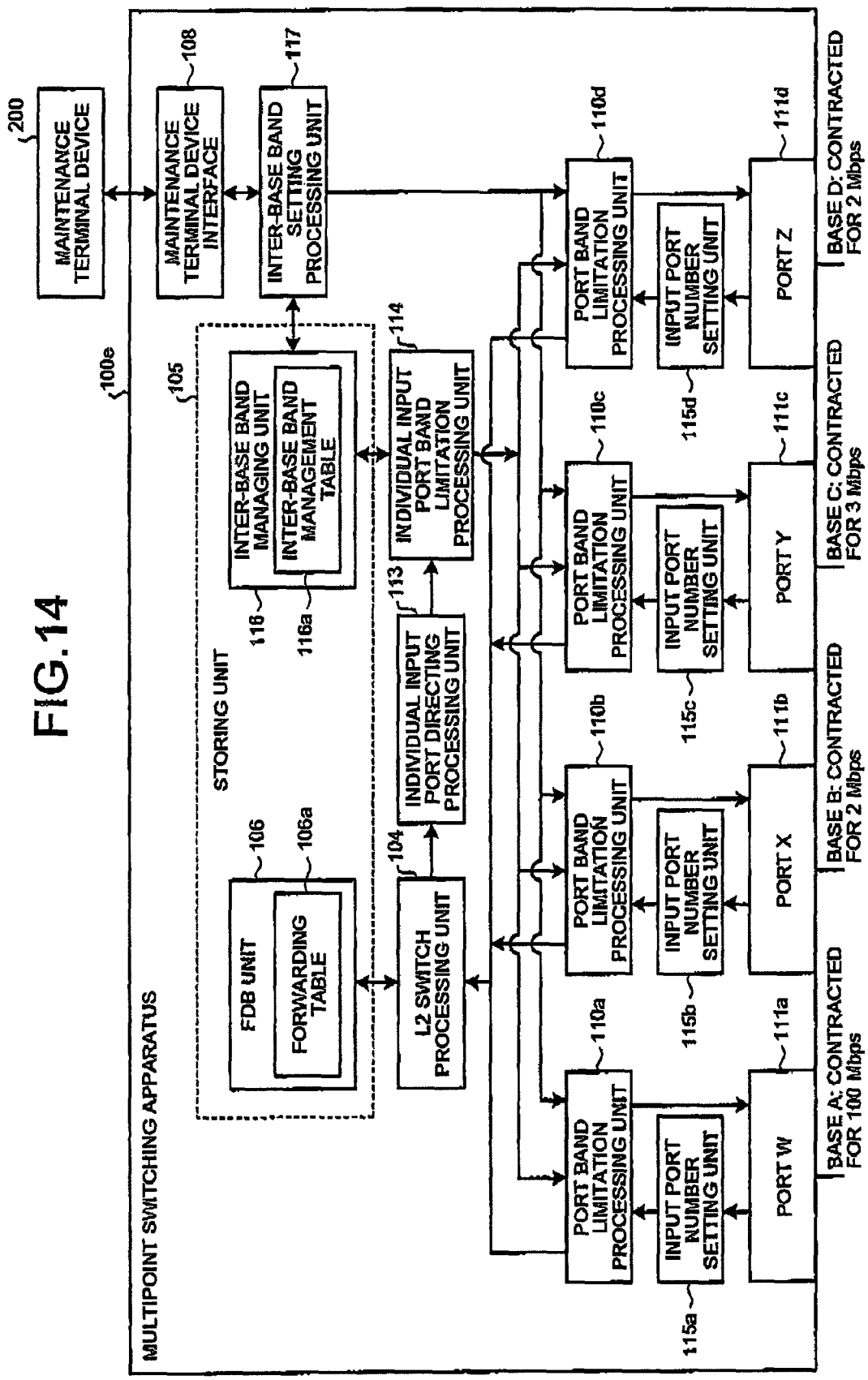
FIG. 14 is a functional block diagram of a fifth variant of the multipoint switching apparatus according to the first embodiment.

Next, a fifth variant of the multipoint switching apparatus 100 will be explained below as a multipoint switching apparatus 100e with reference to FIG. 14. FIG. 14 is a functional block diagram of the multipoint switching apparatus 100e.

The multipoint switching apparatus 100e includes the L2 switch processing unit 104, the individual input port directing processing unit 113, the individual input port band limitation processing unit 114, the storing unit 105 (that includes the FDB unit 106 and the inter-base band managing unit 116), the maintenance terminal device interface 108, the inter-base band setting processing unit 117, the port band limitation processing unit 111a, the port band limitation processing unit 110b, the port band limitation processing unit 110c, the port band limitation processing unit 110d, the port W 111a, the port X 111b, the port Y 111c, the port Z 111d, the input port number setting unit 115a, the input port number setting unit 115b, the input port number setting unit 115c, and the input port number setting unit 115d.

The L2 switch processing unit 104, the individual input port directing processing unit 113, the individual input port band limitation processing unit 114, the maintenance terminal device interface 108, the inter-base band setting processing unit 117, the port band limitation processing unit 110a, the port band limitation processing unit 110b, the port band limitation processing unit 110c, the port band limitation processing unit 110d, the port W 111a, the port X 111b, the port Y 111c the port Z 111d, the input port number setting unit 115a, the input port number setting unit 115b, the input port number setting unit 115c, and the input port number setting unit 111d have the same processing functions as those of the functional blocks that are shown in FIG. 3, FIG. 7, FIG. 9, FIG. 11, or FIG. 13 and have the same names. Thus, the explanation thereof will be omitted. Likewise, the explanation of the processing functions of the functional blocks that are the same as the ones shown in FIG. 3, FIG. 7, FIG. 9, FIG. 11, or FIG. 13 as well as the limitations that are placed and the limitations that are removed will be omitted.

Like the other multipoint switching apparatuses shown in FIG. 3, FIG. 7, FIG. 9, FIG. 11, or FIG. 13, the multipoint switching apparatus 100e has the maintenance terminal device 200 connected thereto, via the maintenance terminal device interface 108. Like in the multipoint switching apparatus 100c or 100d shown in FIG. 11 or FIG. 13, the band set value for each combination of bases (i.e., inter-base band) that is input from the maintenance terminal device 200 is stored into the inter-base band management table 116a included in the inter-base band managing unit 116. More specifically, the band set value for each combination of bases (i.e., inter-base band) is specified in correspondence with the combination of an input port and an output port.

Although not shown in the drawing, needless to say, like in the other multipoint switching apparatuses shown in FIG. 3, FIG. 7, FIG. 9, FIG. 11, or FIG. 13, in the multipoint switching apparatus 100e, the band set value for each of the ports that is input from the maintenance terminal device 200 is stored into the inter-base band management table 116a included in the inter-base band managing unit 116. The band set value for each of the ports is also set into a processing function corresponding to the individual input port within the individual input port band limitation processing unit 114 that has a separate processing function for each of the input ports. Also, a corresponding band set value is set into each of the port band limitation processing units 110a to 110d. In addition, a corresponding band set value is set into each of the ports W 111a to Z 111d.

The multipoint switching apparatus 100e includes the inter-base band managing unit 116 and the inter-base band management table 116a, instead of the contracted band managing unit 107 and the contracted band management table 107a that are included in the multipoint switching apparatus 100b shown in FIG. 9, and also includes the inter-base band setting processing unit 117 instead of the port band setting processing unit 109. Thus, the process performed by the multipoint switching apparatus 100b shown in FIG. 9 is the same as the process performed by the multipoint switching apparatus 100e shown in FIG. 14, except that, in the multipoint switching apparatus 100e shown in FIG. 14, the individual input port band limitation processing unit 114 performs the band limitation process for a packet according to the band limitation value stored for each combination of an input port and an output port in the inter-base band management table 116a, whereas the multipoint switching apparatus 100b shown in FIG. 9 performs the band limitation process for a packet according to the band limitation value that has been set by the port band setting processing unit 109.

In other words, by configuring the multipoint switching apparatus 100e in this manner, the packet that has been input through one of the ports W 111a to Z 111d is, at first, transferred to an output port determined based on the DA contained in the header, by performing an L2 switch process. Subsequently, before being output from the output port, the packet is directed to one of the processing functions within the band limitation processing unit that is in correspondence with the input port, which is apparent. After that, the processing function within the band limitation processing unit to which the packet has been directed performs the band limitation process for the packet according to the band limitation value obtained based on the combination of the input port and the output port, by referring to the inter-base band management table 116a.

By configuring the multipoint switching apparatus 100e in this manner, it is possible to limit the band for the communication between the specific bases. Thus, even if packets are transmitted from a plurality of bases to one base through the multipoint switching apparatus 100e in a congested manner, it is possible to prevent the situation where the band between the multipoint switching apparatus 100e and the base being the transmission destination of the packets is occupied by the packet from one of the bases with a high ratio, and it is therefore possible to distribute the band among the bases equally.

In addition, because it is possible to set a band limit individually for each combination of bases, it is possible to perform the band limitation process in a finely-tuned manner. Further, when the band limitation process for the packet is performed, it is not necessary to perform the searching process for the correspondence relationship of input ports by referring to the forwarding table 106a based on the SA. Thus, it is possible to perform the band limitation process appropriately, even if information of the packet has not yet been included in the forwarding table because the rate of the packet is too high and exceeds the learning capability of the forwarding table 106a.

Figure 15:
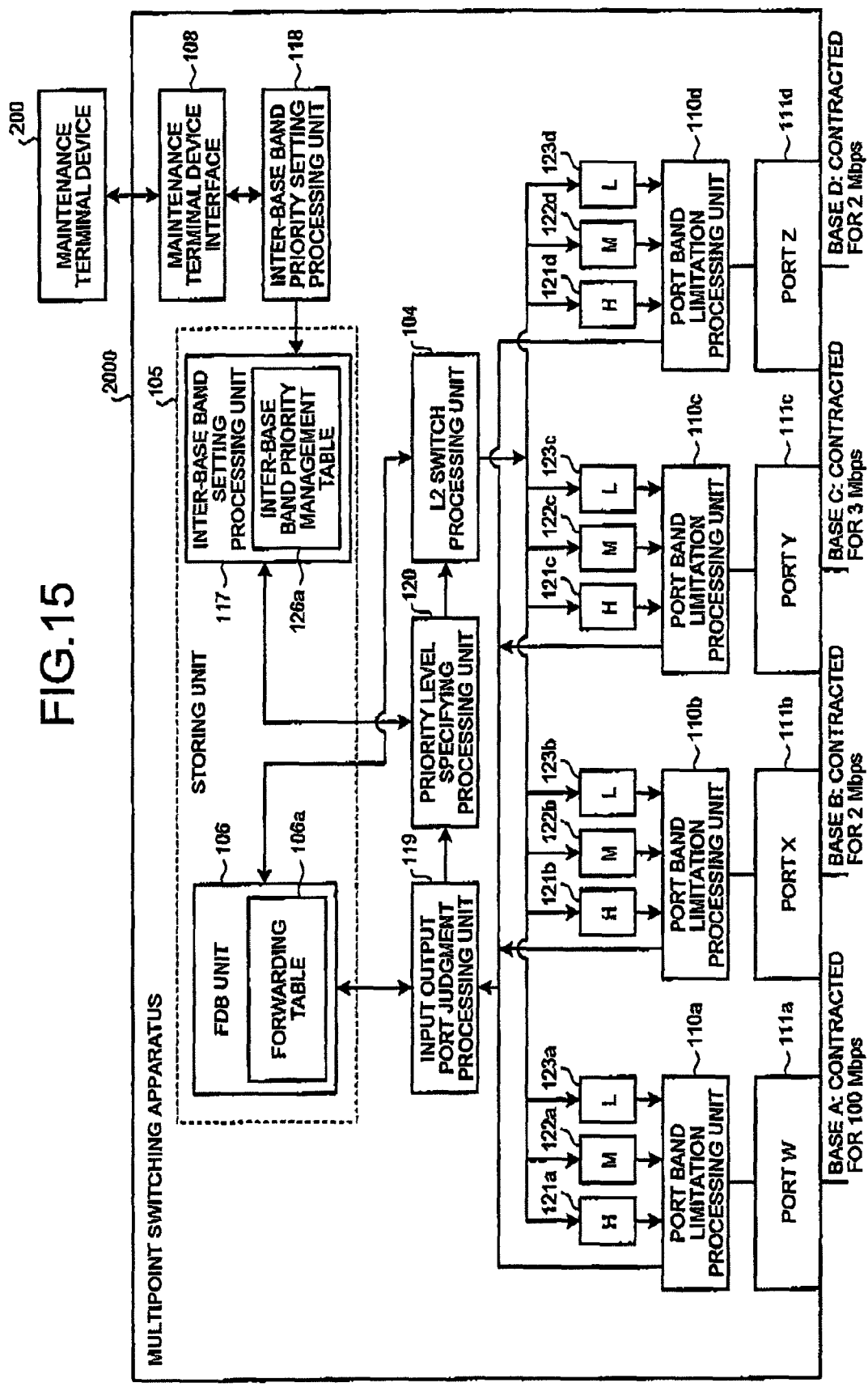
FIG. 15 is a functional block diagram of a multipoint switching apparatus according to a second embodiment of the present invention.
Figure 17:
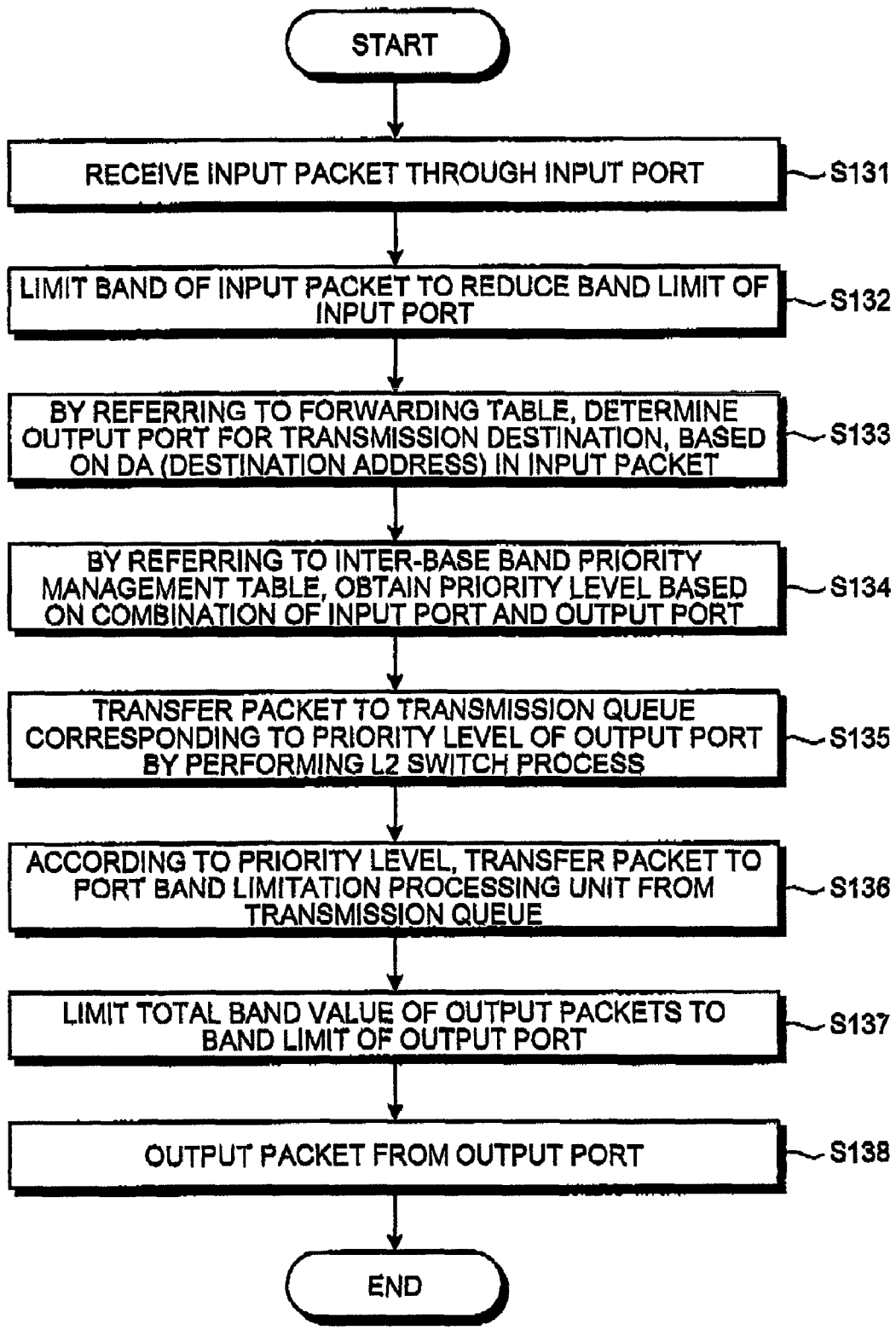
FIG. 17 is a flowchart of a band controlling process performed by the multipoint switching apparatus shown in FIG. 15.

Next, a second embodiment of the present invention will be explained with reference to FIGS. 15 to 17. In the second embodiment, all the examples are based on an assumption that a band limitation process is performed according to a band limitation priority level specified in correspondence with an input port or an output port, based on identification information of the input port or the output port for each packet. First, a multipoint switching apparatus according to the second embodiment will be explained with reference to FIGS. 15 to 17. FIG. 15 is a functional block diagram of a multipoint switching apparatus 2000 according to the second embodiment.

The multipoint switching apparatus 2000 includes an input output port judgment processing unit 119, a priority level specifying processing unit 120, the L2 switch processing unit 104, the storing unit 105, the maintenance terminal device interface 108, an inter-base band priority setting processing unit 118, the port band limitation processing unit 110a, the port band limitation processing unit 110b, the port band limitation processing unit 110c, the port band limitation processing unit 110d, the port W 111a, the port X 111b, the port Y 111c, the port Z 111d, a high priority level transmission queue H 121a, a medium priority level transmission queue M 122a, and a low priority level transmission queue L 123a that are provided in correspondence with the port W 111a, a high priority level transmission queue H 121b, a medium priority level transmission queue M 122b, and a low priority level transmission queue L 123b that are provided in correspondence with the port X 111b, a high priority level transmission queue H 121c, a medium priority level transmission queue M 122c, and a low priority level transmission queue L 123c that are provided in correspondence with the port Y 111c, a high priority level transmission queue E 121d, a medium priority level transmission queue M 122d, and a low priority level transmission queue L 123d that are provided in correspondence with the port Z 111d.

The storing unit 10 further includes the FDB unit 106 and an inter-base band priority managing unit 126. The FDB unit 106 includes the forwarding table 106a. The inter-base band priority managing unit 126 includes an inter-base band priority management table 126a.

The L2 switching processing unit 104, the storing unit 105, the maintenance terminal device interface 108, he inter-base band priority setting processing unit 118, the port band limitation processing unit 110a, the port band limitation processing unit 110b, the port band limitation processing unit 110c, the port band limitation processing unit 110d, the port W 111a, the port X 111b, the port Y 111c, and the port Z 111d have the same processing functions as those of the functional blocks that are shown in the first embodiment and have the same names. Thus, the explanation thereof will be omitted. Likewise, the explanation of the processing functions of the functional blocks that are the same as the ones shown in the first embodiment as well as the limitations that are placed and the limitations that are removed will be omitted.

The input output port judgment processing unit 119 is a processing unit that judges to which one of the input ports the base being the transmission source is connected and to which one of the output ports the base being the destination is connected, by referring to the forwarding table 106a, based on the SA and the DA contained in the header of the packet that has been input through one of the ports W 111a to Z 111d and has been forwarded after the band thereof is limited by the port band limitation processing unit (i.e., one of the port band limitation processing units 110a to 110d) that is in correspondence with the port. The packet for which the input port and the output port have been determined by the input output port judgment processing unit 119 is forwarded to the priority level specifying processing unit 120.

By referring to the inter-base band priority management table based on the identification information of the input port and the identification information of the output port for the packet that has been forwarded from the input output port judgment processing unit 119, the priority level specifying processing unit 120 obtains an output priority level of the packet and sets the obtained output priority level as priority level information (for example, a Class of Service [CoS] value in a Virtual Local Area Network [VLAN] tag) contained in the header of the packet. The packet of which the output priority level has been set by the priority level specifying processing unit 120 is transferred to the determined output port by the L2 switching processing unit 104.

When transferring the packet to the output port, the L2 switch processing unit 104 directs the packet to one of the three priority level transmission queues (i.e., the high priority level transmission queue H, the medium priority level transmission queue M, and the low priority level transmission queue L) that is positioned so as to employed before the output port and the band limitation processing unit for the output port, based on the priority level information contained in the header of the packet. For example, when the priority level information contained in the header of the packet indicates "high" (i.e., a high priority level), the packet is directed to the high priority level transmission queue H. When the priority level information contained in the header of the packet indicates "medium" (i.e., a medium priority level), the packet is directed to the medium priority level transmission queue M. When the priority level information contained in the header of the packet indicates "low" (i.e., a low priority level), the packet is directed to the low priority level transmission queue L.

All the packets that are queued in the high priority level transmission queues Hs (i.e., the high priority level transmission queue H 121a, the high priority level transmission queue H 121b, the high priority level transmission queue H 121c, and the high priority level transmission queue H 121d) are output prior to the packets that are queued in the medium priority level transmission queues Ms and the low priority level transmission queues Ls. All the packets that are queued in the medium priority level transmission queues Ms (i.e., the medium priority level transmission queue M 122a, the medium priority level transmission queue M 122b, the medium priority level transmission queue M 122c, and the medium priority level transmission queue M 122d) are output prior to the packets that are queued in the low priority level transmission queues Ls, but have no priority over the packets queued in the high priority level transmission queues Hs and are output after all the packets queued in the high priority level transmission queues Hs are output. All the packets that are queued in the low priority level transmission queues Ls (i.e., the low priority level transmission queue L 123a, the low priority level transmission queue L 123b, the low priority level transmission queue L 123*c*, and the low priority level transmission queue L 123*d*) have no priority over the packets that are queued in the high priority level transmission queues Hs and the medium priority level transmission queues Ms and are output after all these packets are output.

The number of priority level transmission queues provided for each output port does not have to be three as described above. The number of priority level transmission queues may be two or may be more than three. Further, the priority control for outputting the packets described above is merely an example. Alternatively, any other method may be used.

Next, the inter-base band priority management table 126*a* shown in FIG. 15 will be explained. FIG. 16 is a drawing for explaining the inter-base band priority management table 126*a* shown in FIG. 15. As shown in the drawing, the inter-base band priority management table 126*a* stores therein priority levels in correspondence with combinations each made up of identification information of an input port and identification information of an output port. By referring to the inter-base band priority management table 126*a*, it is possible to obtain the output priority level of a packet (i.e., the priority level indicating in which level of priority level transmission queue, the packet should be queued), based on the combination of the identification information of the input port and the identification information of the output port.

Next, a band controlling process performed by the multipoint switching apparatus 2000 will be explained. FIG. 17 is a flowchart of the band controlling process performed by the multipoint switching apparatus 2000.

First, the multipoint switching apparatus 2000 receives an input of a packet through one of the ports W 111*a* to Z 111*d* (step S131). Subsequently, the port band limitation processing unit (i.e., one of the port band limitation processing units 110*a* to 110*d*) that is in correspondence with the port through which the input of the packet is received at step S131 limits the band of the input packet so as to reduce it to the band set value that has been set to the port (step S132).

After that, by referring to the forwarding table 106*a*, the input output port judgment processing unit 119 judges to which one of the input ports the base being the transmission source from which the packet has been input is connected and to which one of the output ports the base being the transmission destination to which the packet is transmitted is connected, based on the SA and the DA of the input packet of which the band has been limited down to the band limit at step S132 (step S133).

Subsequently, the priority level specifying processing unit 120 obtains a priority level by referring to the inter-base band priority management table 126*a*, based on the identification information of the input port and the identification information of the output port and sets the obtained priority level as priority level information contained in the header of the packet for which the input port and the output port have been determined at step S133 (step S134).

After that, by referring to the forwarding table 106*a*, the L2 switch processing unit 104 identifies an output port for the packet of which the output priority level has been set at step S134, based on the destination information contained in the header, and performs an L2 switch process so as to transfer the packet to one of the priority level transmission queues that has an output priority level corresponding to the identified output port (step S135).

Subsequently, the corresponding one of the priority level transmission queues (i.e., the high priority level transmission queue H, the medium priority level transmission queue M, and the low priority level transmission queue L) transfers the packet that has been queued at step S135 to the port band limitation processing unit (i.e., one of the port band limitation processing units 110*a* to 110*d*) that is positioned so as to be employed before the output port to which the packet is to be transferred, according to the priority level (step S136).

After that, the port band limitation processing unit (i.e., one of the port band limitation processing units 110*a* to 110*d*) to which the packet has been transferred limits a total band for all the output packets to the band set value that has been set to the port (step S137). Subsequently, the multipoint switching apparatus 2000 outputs the packet from the output port (step S138).

By configuring the multipoint switching apparatus 200 in this manner, it is possible to limit the band for the communication between the specific bases. Thus, even if packets are transmitted from a plurality of bases to one base through the multipoint switching apparatus 2000 in a congested manner, by setting the priority levels to define the order in which the packets are output, it is possible to prevent the situation where the band between the multipoint switching apparatus 2000 and the base being the transmission destination of the packets is occupied by some of the packets with a high ratio, and it is therefore possible to distribute the band with a desired ratio.

In addition, because the priority level of each packet is determined on the input port side, which is positioned so as to be employed before the L2 switch process is performed, it is possible to reduce the processing load of the multipoint switching apparatus 2000 at the following stages.

Figure 18:
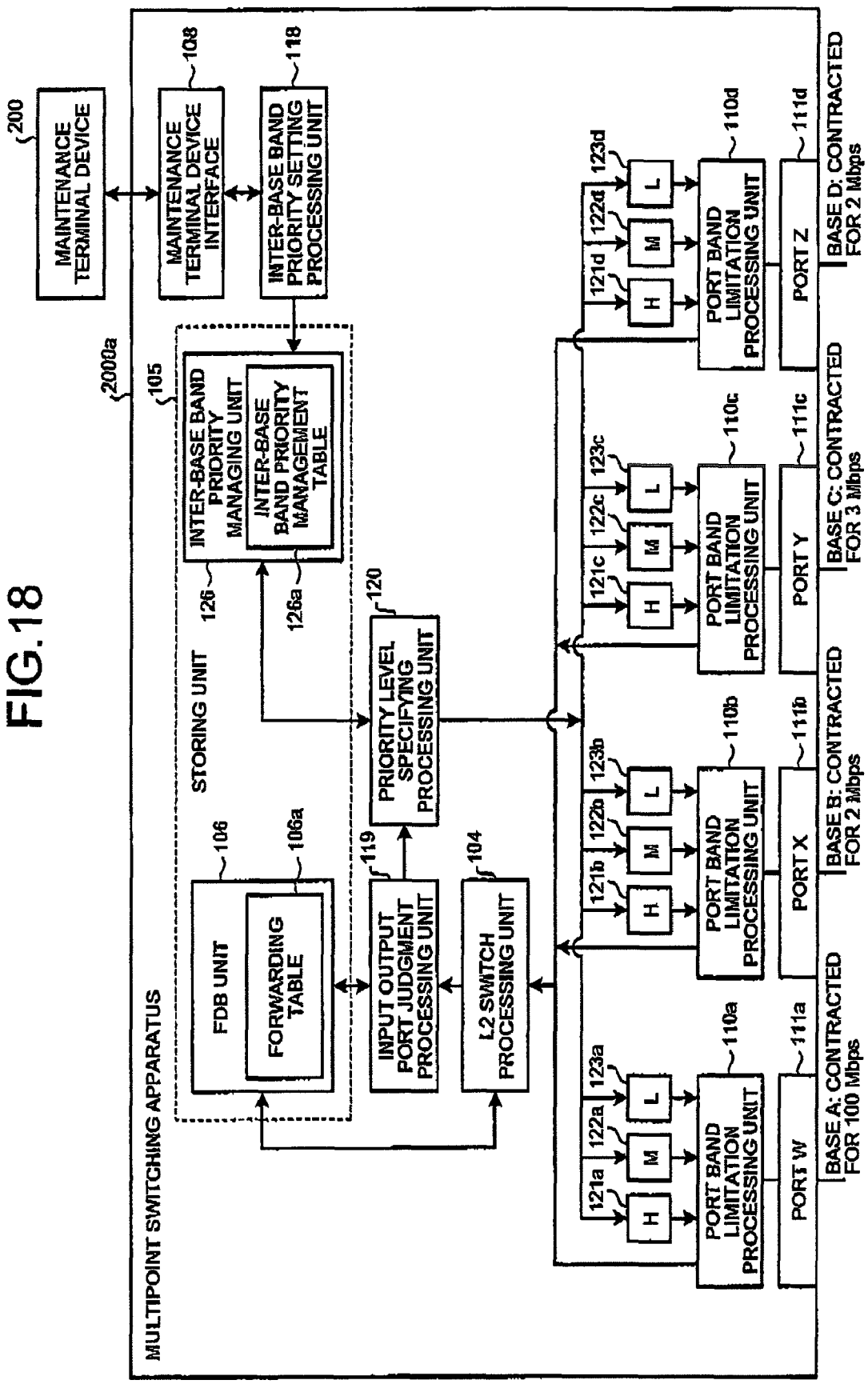
FIG. 18 is a functional block diagram of a variant of the multipoint switching apparatus according to the second embodiment.
Figure 19:
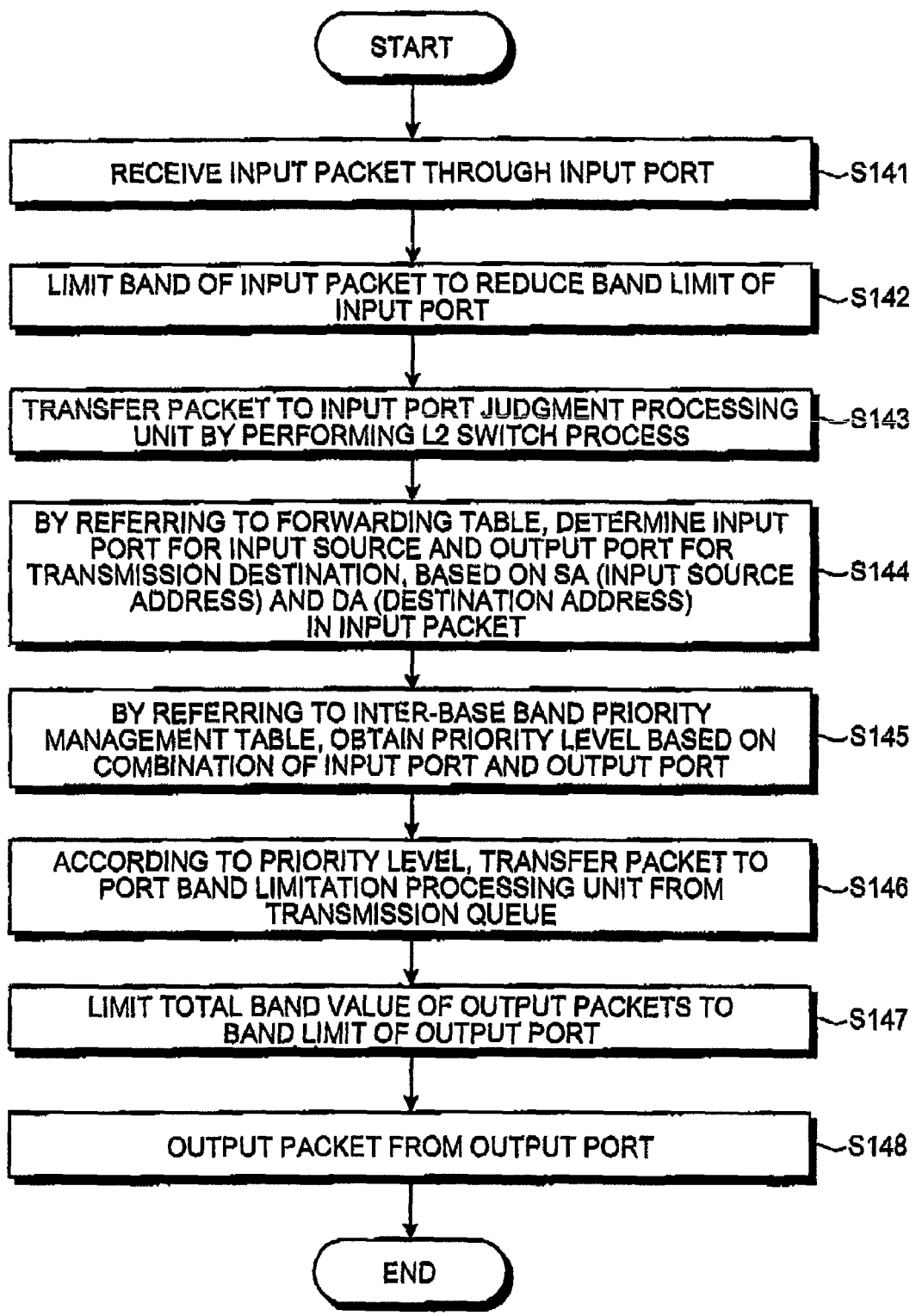
FIG. 19 is a flowchart of a band controlling process performed by the multipoint switching apparatus shown in FIG. 18.

Next, a first variant of the multipoint switching apparatus 2000 will be explained below as a multipoint switching apparatus 2000*a* with reference to FIGS. 18 and 19. FIG. 18 is a functional block diagram of the multipoint switching apparatus 2000*a*.

The multipoint switching apparatus 2000*a* includes the L2 switch processing unit 104, the input output port judgment processing unit 119, the priority level specifying processing unit 120, the storing unit 105, the maintenance terminal device interface 108, the inter-base band priority setting processing unit 118, the port band limitation processing unit 110*a*, the port band limitation processing unit 110*b*, the port band limitation processing unit 110*c*, the port band limitation processing unit 110*d*, the port W 111*a*, the port X 111*b*, the port Y 111*c*, the port Z 111*d*, the high priority level transmission queue H 121*a*, the medium priority level transmission queue M 122*a*, and the low priority level transmission queue L 123*a* that are provided in correspondence with the port W 111*a*, the high priority level transmission queue H 121*b*, the medium priority level transmission queue M 122*b*, and the low priority level transmission queue L 123*b* that are provided in correspondence with the port X 111*b*, the high priority level transmission queue H 121*c*, the medium priority level transmission queue M 122*c*, and the low priority level transmission queue L 123*c* that are provided in correspondence with the port Y 111*c*, the high priority level transmission queue H 121*d*, the medium priority level transmission queue M 122*d*, and the low priority level transmission queue L 123*d* that are provided in correspondence with the port Z 111*d*.

The storing unit 105 further includes the FDB unit 106 and the inter-base band priority managing unit 126. The FDB unit 106 includes the forwarding table 106*a*. The inter-base band priority managing unit 126 includes the inter-base band priority management table 126*a*.

All of the functional blocks shown in FIG. 18 have the same processing functions as those of the functional blocks that are shown in FIG. 15 and have the same names. However, because the L2 switch processing unit 104 is positioned in a different place, the process performed by the multipoint switching apparatus 2000a shown in FIG. 18 is partially different from the process performed by the multipoint switching apparatus 2000 shown in FIG. 15. Thus, only the different part will be explained below. The explanation of the processing functions of the functional blocks that are the same as the ones shown in FIG. 15 as well as the limitations that are placed and the limitations that are removed will be omitted.

The L2 switch processing unit 104 is a processing unit that performs a normal layer 2 switch process and directs each packet to an output port determined according to a judgment based on the address information contained in the header of the packet forwarded from the port band limitation processing unit (i.e., one of the port band limitation processing units 110a to 110d), by referring to the forwarding table 106a. However, it should be noted that the packet is forwarded to the input output port judgment processing unit 119 before the packet is directed to the output port because the functional block that performs the priority level specifying process is positioned so as to be employed after the L2 switch process is performed, according to the configuration of the multipoint switching apparatus shown in FIG. 18.

The input output port judgment processing unit 119 is a processing unit that judges to which one of the input ports the base being the transmission source is connected and to which one of the output ports the base being the destination is connected, by referring to the forwarding table 106a, based on the SA and the DA contained in the header of the packet that has been input through one of the ports W 111a to Z 111d and has been forwarded after the band thereof is limited by the port band limitation processing unit (i.e., one of the port band limitation processing units 110a to 110d) that is in correspondence with the port. The packet for which the input port and the output port have been determined by the input output port judgment processing unit 119 is forwarded to the priority level specifying processing unit 120.

By referring to the inter-base band priority management table based on the identification information of the input port and the identification information of the output port for the packet that has been forwarded from the input output port judgment processing unit 119, the priority level specifying processing unit 120 obtains an output priority level of the packet and sets the obtained output priority level as priority level information (for example, a Class of Service [CoS] value in a Virtual Local Area Network [VLAN] tag) contained in the header of the packet. The packet of which the output priority level has been set by the priority level specifying processing unit 120 is transferred to the determined output port by the L2 switching processing unit 104.

When transferring the packet to the output port, the priority level specifying processing unit 120 directs the packet to one of the three priority level transmission queues (i.e., the high priority level transmission queue H, the medium priority level transmission queue M, and the low priority level transmission queue L) that is positioned so as to be employed before the output port and the band limitation processing unit for the output port, based on the priority level information contained in the header of the packet. The details of the priority level transmission queues are the same as explained in the description of the other mode of the configuration for the multipoint switching apparatus according to the second embodiment.

Next, a band controlling process performed by the multipoint switching apparatus 2000a will be explained. FIG. 19 is a flowchart of the band controlling process performed by the multipoint switching apparatus 2000a.

First, the multipoint switching apparatus 2000a receives an input of a packet through one of the ports W 111a to Z 111d (step S141). Subsequently, the port band limitation processing unit (i.e., one of the port band limitation processing units 110a to 110d) that is in correspondence with the port through which the input of the packet is received at step S141 limits the band of the input packet so as to reduce it to the band set value that has been set to the port (step S142).

After that, by referring to the forwarding table 106a, the L2 switching processing unit 104 identifies the output port, based on the destination information contained in the header of the packet of which the band has been limited at step s142 and performs an L2 switch process so as to transfer the packet to the identified output port (step S143).

Subsequently, by referring to the forwarding table 106a, the input output port judgment processing unit 119 judges to which one of the input ports the base being the transmission source from which the packet has been input is connected and to which one of the output ports the base being the transmission destination to which the packet is transmitted is connected, based on the SA and the DA of the input packet that has been transferred by the L2 switch process at step S143 (step S144).

After that, the priority level specifying processing unit 120 obtains a priority level by referring to the inter-base band priority management table 126a, based on the identification information of the input port and the identification information of the output port and sets the obtained priority level as priority level information contained in the header of the packet for which the input port and the output port have been determined at step S144. The priority level specifying processing unit 120 then transfers the packet to one of the priority level transmission queues that has an output priority level corresponding to the output port identified at step S143 (step S145).

Next, the corresponding one of the priority level transmission queues (i.e., the high priority level transmission queue H, the medium priority level transmission queue H, and the low priority level transmission queue L) transfers the packet that has been queued at step s145 to the port band limitation processing unit (i.e., one of the port band limitation processing units 110a to 110d) that is positioned so as to be employed before the output port to which the packet is to be transferred, according to the priority level (step S146).

After that, the port band limitation processing unit (i.e., one of the port band limitation processing units 110a to 110d) to which the packet has been transferred limits a total band for all the output packets to the band set value that has been set to the port (step S147). Subsequently, the multipoint switching apparatus 100 outputs the packet from the output port (step S148).

By configuring the multipoint switching apparatus 2000a in this manner, it is possible to limit the band for the communication between the specific bases. Thus, even if packets are transmitted from a plurality of bases to one base through the multipoint switching apparatus 2000a in a congested manner, by setting the priority levels to define the order in which the packets are output, it is possible to prevent the situation where the band between the multipoint switching apparatus 2000a and the base being the transmission destination of the packets is occupied by some of the packets with a high ratio, and it is therefore possible to distribute the band with a desired ratio.

Figure 20:
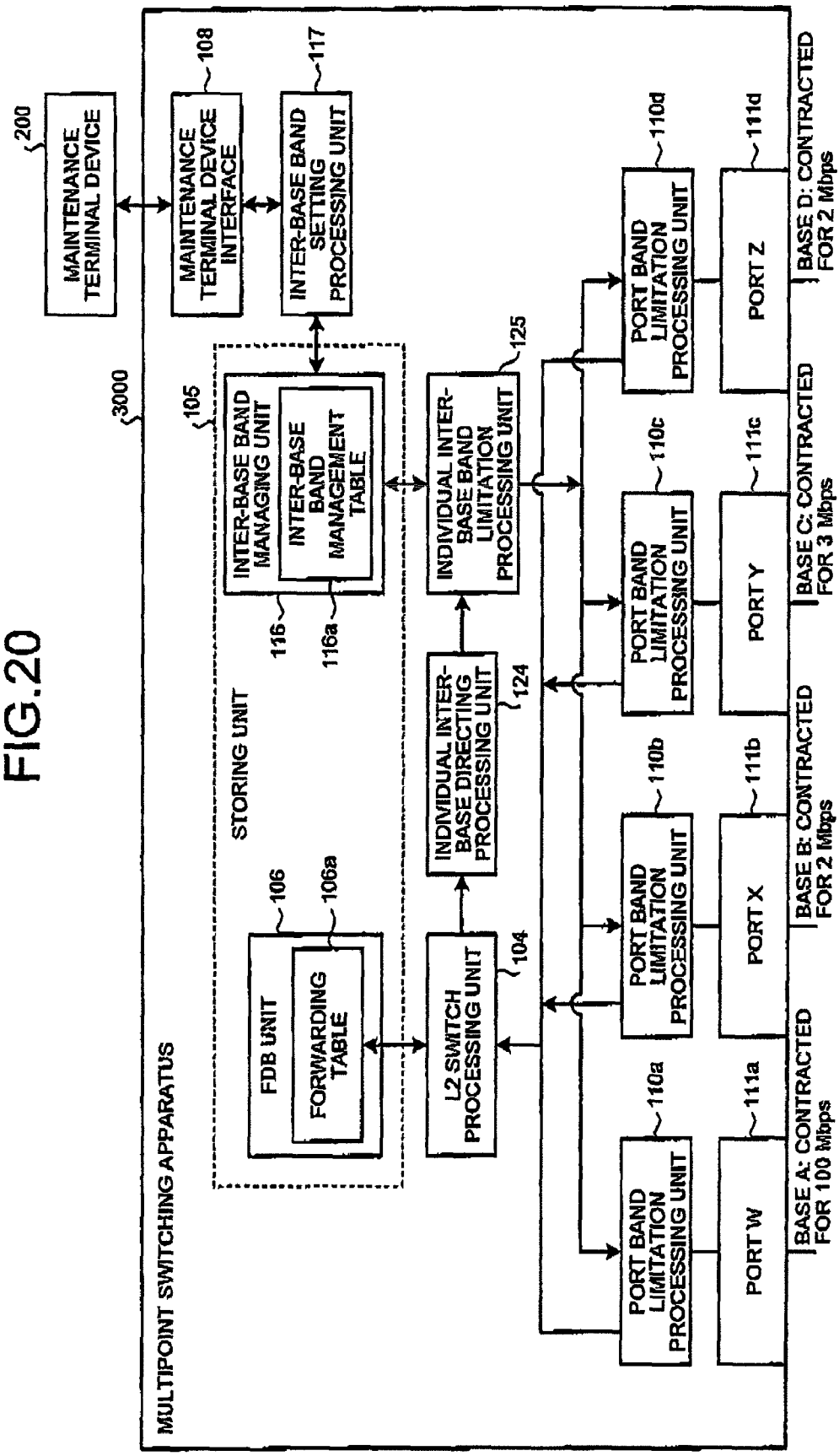
FIG. 20 is a functional block diagram of a multipoint switching apparatus according to a third embodiment of the present invention.

Next, a third embodiment of the present invention will be explained with reference to FIGS. 20 to 27. In the third embodiment, the band limitation process is performed, based on the input port and the DA of the packet or the SA and the identification information of the output port, according to a band limitation set value that is specified in correspondence with a combination of these elements. Basically, the third embodiment is a modified embodiment of the first embodiment. First, a multipoint switching apparatus according to the third embodiment will be explained with reference to FIGS. 20 to 22. FIG. 20 is a functional block diagram of a multipoint switching apparatus 3000 according to the third embodiment.

The multipoint switching apparatus 3000 includes the L2 switch processing unit 104, an individual inter-base directing processing unit 124, an individual inter-base band limitation processing unit 125, the storing unit 105 (that includes the FDB unit 106 and the inter-base band managing unit 116), the maintenance terminal device interface 108, the inter-base band setting processing unit 117, the port band limitation processing unit 110a, the port band limitation processing unit 110b, the port band limitation processing unit 110c, the port band limitation processing unit 110d, the port W 111a, the port X 111b, the port Y 111c, and the port Z 111d.

The L2 switch processing unit 104, the storing unit 105, the maintenance terminal device interface 108, the inter-base band setting processing unit 117, the port band limitation processing unit 110a, the port band limitation processing unit 110b, the port band limitation processing unit 110c, the port band limitation processing unit 110d, the port W 111a, the port X 111b, the port Y 111c, and the port Z 111d have the same processing functions as those of the functional blocks that are described in the first embodiment and have the same names. Thus, the explanation thereof will be omitted. Likewise, the explanation of the processing functions of the functional blocks that are the same as the ones described in the first embodiment as well as the limitations that are placed and the limitations that are removed will be omitted.

Based on the SA and the output port of a packet forwarded from the L2 switch processing unit 104, the individual inter-base directing processing unit 124 directs the packet to one of the processing functions within the individual inter-base band limitation processing unit 125 that is in correspondence with the combination of the SA and the output port.

The individual inter-base band limitation processing unit 125 is a processing unit that has a separate processing function that limits the band, for each combination of bases that is defined by an SA and an output port. The individual inter-base band limitation processing unit 125 limits the band of each input packet, according to the band set value that has been set for each of the processing functions respectively corresponding to individual combinations of bases (i.e., inter-base band), by referring to the inter-base band management table 116a. The individual inter-base band limitation processing unit 125 then transfers the packet of which the band has been limited to the output port.

Next, the inter-base band management table 116a shown in FIG. 20 will be explained. FIG. 21 is a drawing for explaining the inter-base band management table 116a shown in FIG. 20. As shown in the drawing, the inter-base band management table 116a stores therein band limits in correspondence with combinations each made up of a transmission source address of a packet and identification information of an output port. By referring to the inter-base band management table 116a, it is possible to obtain the band limitation value of a packet at a stage before the output port, based on the combination of the transmission source address of the packet and the identification information of the output port.

Figure 22:
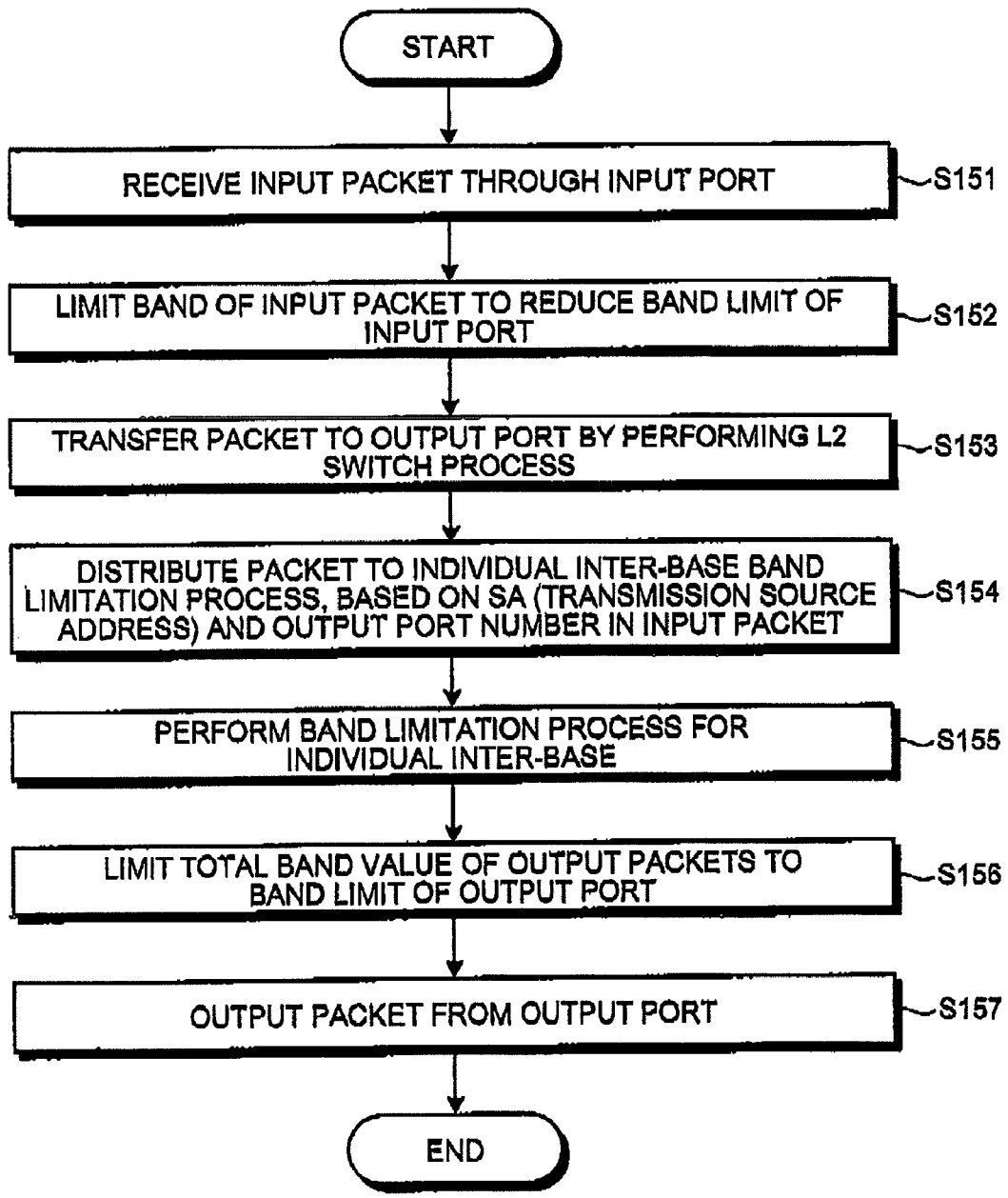
FIG. 22 is a flowchart of a band controlling process performed by the multipoint switching apparatus shown in FIG. 20.

Next, a band controlling process performed by the multipoint switching apparatus 3000 will be explained. FIG. 22 is a flowchart of the band controlling process performed by the multipoint switching apparatus 3000.

First, the multipoint switching apparatus 3000 receives an input of a packet through one of the ports W 111a to Z 111d (step S151). Subsequently, the port band limitation processing unit (i.e., one of the port band limitation processing units 110a to 110d) that is in correspondence with the port through which the input of the packet is received at step S151 limits the band of the input packet so as to reduce it to the band set value that has been set to the port (step S152).

After that, by referring to the forwarding table 106a, the L2 switch processing unit 104 identifies an output port based on the destination information contained in the header of the packet of which the band has been limited at step S152 and performs an L2 switch process so as to transfer the packet to the identified output port (step S153).

Subsequently, by referring to the forwarding table 106a based on inter-base information defined by a combination of the SA and the identification information of the output port (e.g. a port number) of the packet that has been transferred at step S153, the individual inter-base directing processing unit 124 directs the packet to one of the processing functions within the individual inter-base band limitation processing unit 125 that is in correspondence with the inter-base information (step S154). The one of the processing functions within the individual inter-base band limitation processing unit 125 that is in correspondence with the inter-base information and to which the packet has been directed performs the band limitation process for the packet (step S155).

After that, the port band limitation processing unit (i.e., one of the port band limitation processing units 110a to 110d) limits a total band for all the output packets to the band set value that has been set to the port, the port band limitation processing unit being positioned so as to be employed before the output port through which the packet of which the band has been limited at step S155 is to be output (step S156). Subsequently, the multipoint switching apparatus 3000 outputs the packet from the output port (step S157).

By configuring the multipoint switching apparatus 3000 in this manner, it is possible to limit the band for the communication between the specific bases. Thus, even if packets are transmitted from a plurality of bases to one base through the multipoint switching apparatus 3000 in a congested manner, it is possible to prevent the situation where the band between the multipoint switching apparatus 3000 and the base being the transmission destination or the packets is occupied by the packet from one of the bases with a high ratio, and it is therefore possible to distribute the band among the bases equally.

In addition, because it is possible to set a band limit individually for each combination of bases, it is possible to perform the band limitation process in a finely-tuned manner. Furthermore, it is possible to obtain the band limitation value based on the combination of the transmission source address contained in the packet and the destination port, without having to make judgment on the transmission source port. Consequently, it is possible to perform the process more efficiently, and also, it is possible to perform the band limitation process, even if the transmission source port is unknown.

It is also acceptable to use the inter-base band management table 116a shown in FIG. 23, instead of the inter-base band management table 116a included in the multipoint switching apparatus 3000. The inter-base band management table 116a shown in FIG. 23 stores therein the band limits in correspondence with combinations each made up of a transmission source address and a destination address of a packet. By referring to the inter-base band management table 116a shown in FIG. 23, it is possible to obtain the band limitation value of a packet at a stage before the output port, based on the combination of the transmission source address and the destination address of the packet.

Figure 24:
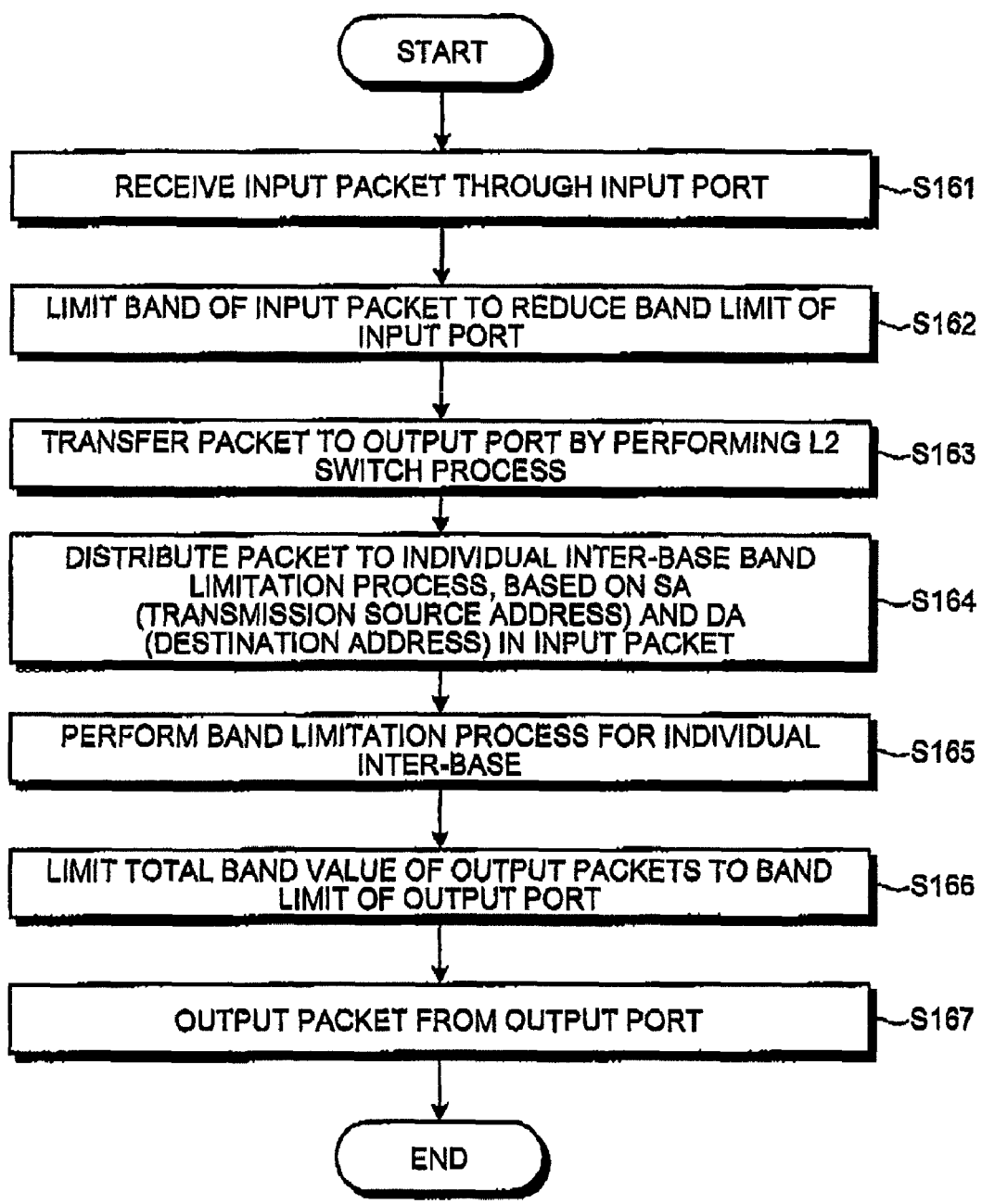
FIG. 24 is a flowchart of a band controlling process performed by the multipoint switching apparatus shown in FIG. 20.

Next, a band controlling process performed by the multipoint switching apparatus 3000 when the inter-base band management table 116a shown in FIG. 23 is used, instead of the inter-base band management table 116a included in the multipoint switching apparatus 3000, will be explained. FIG. 24 is a flowchart of the band controlling process performed by the multipoint switching apparatus 3000 shown in FIG. 20 when the inter-base band management table 116a shown in FIG. 23 is used.

First, the multipoint switching apparatus 3000 receives an input of a packet through one of the ports W 111a to Z 111d (step S161). Subsequently, the port band limitation processing unit (i.e., one of the port band limitation processing units 110a to 110d) that is in correspondence with the port through which the input of the packet is received at step S161 limits the band of the input packet so as to reduce it to the band set value that has been set to the port (step S162).

After that, by referring to the forwarding table 106a, the L2 switch processing unit 104 identifies an output port based on the destination information contained in the header of the packet of which the band has been limited at step S162 and performs an L2 switch process so as to transfer the packet to the identified output port (step S163).

Subsequently, by referring to the forwarding table 106a based on inter-base information defined by a combination of the SA and the DA of the packet that has been transferred at step S163, the individual inter-base directing processing unit 124 directs the packet to one of the processing functions within the individual inter-base band limitation processing unit 125 that is in correspondence with the inter-base information (step S164). The one of the processing functions within the individual inter-base band limitation processing unit 125 that is in correspondence with the inter-base information and to which the packet has been directed performs the band limitation process for the packet (step S165).

After that, the port band limitation processing unit (i.e., one of the port band limitation processing units 110a to 110d) limits a total band for all the output packets to the band set value that has been set to the port, the port band limitation processing unit being positioned so as to be employed before the output port through which the packet of which the band has been limited at step S165 is to be output (step S166). Subsequently, the multipoint switching apparatus 3000 outputs the packet from the output port (step S167).

Because it is possible to set a band limit individually for each combination of bases, it is possible to perform the band limitation process in a finely tuned manner. Furthermore, it is possible to obtain the band limitation value based on the combination of the transmission source address and the destination address contained in the packet, without having to make judgment on the transmission source port and the destination port. Consequently, it is possible to perform the process more efficiently, and also, it is possible to perform the band limitation process, even if the transmission source port and the destination port are unknown.

Figure 25:
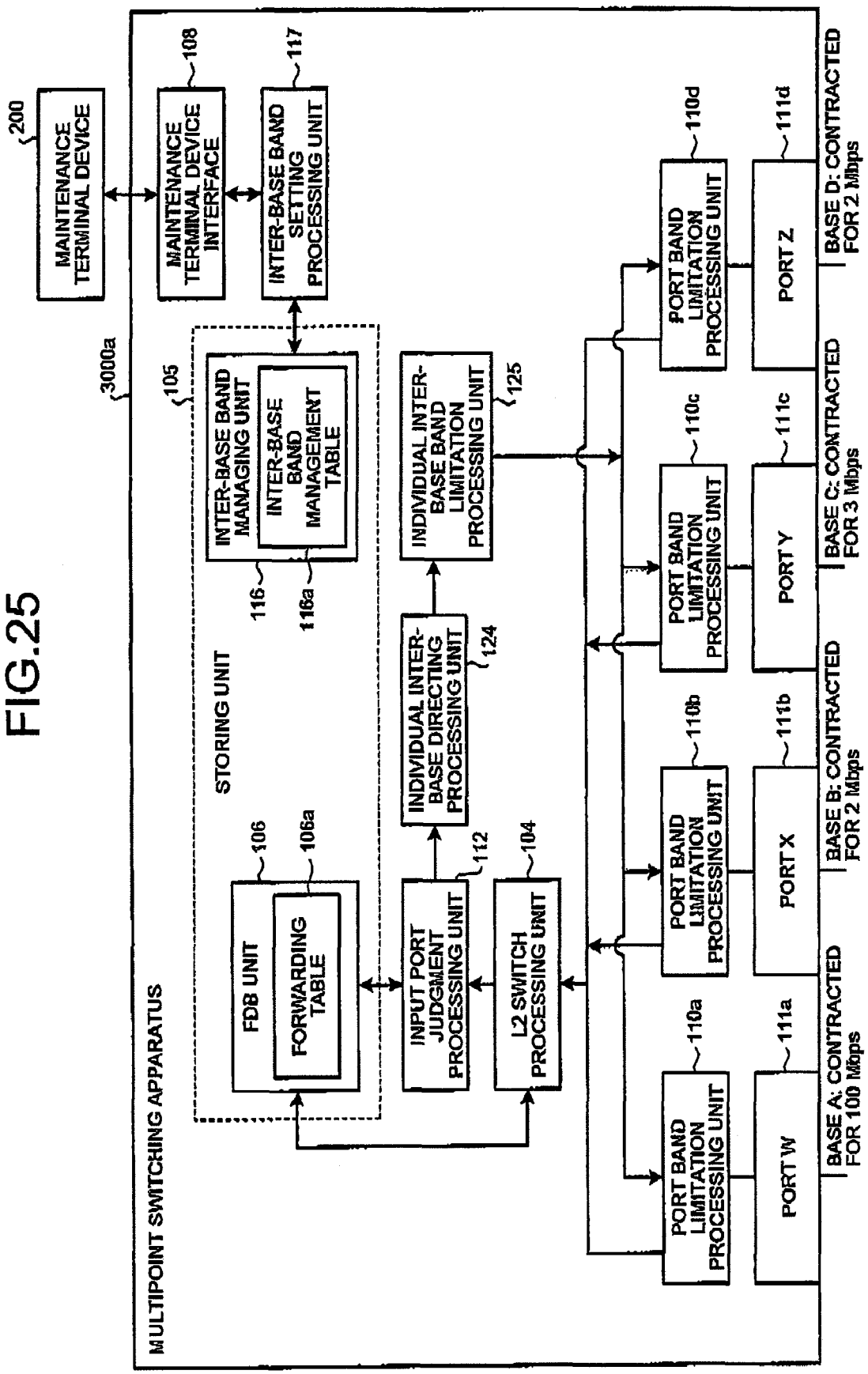
FIG. 25 is a functional block diagram of a variant of the multipoint switching apparatus according to the third embodiment.

Next, a variant of the multipoint switching apparatus 3000 will be explained below as a multipoint switching apparatus 3000a with reference to FIGS. 25 to 27. FIG. 25 is a functional block diagram of the multipoint switching apparatus 3000a.

The multipoint switching apparatus 3000a includes the L2 switch processing unit 104, the input port judgment processing unit 112, the individual inter-base directing processing unit 124, the individual inter-base band limitation processing unit 125, the storing unit 105 (that includes the FDB unit 106 and the inter-base band managing unit 116), the maintenance terminal device interface 108, the inter-base band setting processing unit 117, the port band limitation processing unit 110a, the port band limitation processing unit 110b, the port band limitation processing unit 110c, the port band limitation processing unit 110d, the port W 111a, the port X 111b, the port Y 111c, and the port Z 111d.

The input port judgment processing unit 112, the individual inter-base directing processing unit 124, the individual inter-base band limitation processing unit 125, the maintenance terminal device interface 108, the inter-base band setting processing unit 117, the port band limitation processing unit 110a, the port band limitation processing unit 110b, the port band limitation processing unit 110c, the port band limitation processing unit 110d, the port W 111a, the port X 111b, the port Y 111c, and the port Z 111d have the same processing functions as those of the functional blocks that are shown in FIG. 20 and have the same names. Thus, the explanation thereof will be omitted. Likewise, the explanation of the processing functions of the functional blocks that are the same as the ones shown in FIG. 20 as well as the limitations that are placed and the limitations that are removed will be omitted.

The L2 switch processing unit 104 is a processing unit that performs a normal layer 2 switch process and directs each packet to an output port determined according to a judgment based on the address information contained in the header of the packet forwarded from the port band limitation processing unit (i.e., one of the port band limitation processing units 110a to 110d), by referring to the forwarding table 110a. It should be noted, however, that the functional block that performs the band limitation process is positioned so as to be employed after the L2 switch process is performed, according to the configuration of the multipoint switching apparatus shown in FIG. 25. Accordingly, the packet is forwarded to the input port judgment processing unit 112 before the packet is directed to the output port.

The input port judgment processing unit 112 is a processing unit that judges to which one of the input ports, the base being the transmission source is connected, by referring to the forwarding table 106a, based on the SA contained in the header of the packet forwarded from the L2 switch processing unit 104.

Based on the input port and the output port, which is apparent, of the a packet forwarded from the input port judgment processing unit 112, the individual inter-base directing processing unit 124 directs the packet to one of the processing functions within the individual inter-base band limitation processing unit 125 that is in correspondence with the combination of the input port and the output port.

The individual inter-base band limitation processing unit 125 is a processing unit that has a separate processing function that limits the band, for each combination of bases that is defined by an input port and an output port. The individual inter-base band limitation processing unit 125 limits the band of each input packet, according to the band set value that has been set for each of the processing functions respectively corresponding to individual combinations of bases (i.e., inter-base band), by referring to the inter-base band management table 116a. The individual inter-base band limitation processing unit 125 then transfers the packet of which the band has been limited to the output port.

Next, the inter-base band management table 116a shown in FIG. 25 will be explained. FIG. 26 is a drawing for explaining the inter-base band management table 116a shown in FIG. 25. As shown in the drawing, the inter-base band management table 116a stores therein band limits in correspondence with combinations each made up of an input port and a destination address of a packet. By referring to the inter-base band management table 116a, it is possible to obtain the band limitation value of a packet at a stage before the output port, based on the combination of the input port and the destination address of the packet.

Next, the band controlling process performed by the multipoint switching apparatus 3000a will be explained. FIG. 27 is a flowchart of the band controlling process performed by the multipoint switching apparatus 3000a.

First, the multipoint switching apparatus 3000a receives an input of a packet through one of the ports W 111a to Z 111d (step S171). Subsequently, the port band limitation processing unit (i.e., one of the port band limitation processing units 110a to 110d) that is in correspondence with the port through which the input of the packet is received at step S171 limits the band of the input packet so as to reduce it to the band set value that has been set to the port (step S172).

After that, by referring to the forwarding table 106a, the L2 switch processing unit 104 identifies an output port based on the destination information contained in the header of the packet of which the band has been limited at step S172 and performs an L2 switch process so as to transfer the packet to the identified output port (step S173).

Subsequently, by referring to the forwarding table 106a based on the SA of the packet that has been transferred at step S173, the input port judgment processing unit 112 judges to which one of the input ports, the base being the transmission source from which the packet has been input is connected (step S174).

After that, based on inter-base information defined by a combination of the DA and the input port of the packet which is determined based on the judgment made at step S174, the individual inter-base directing processing unit 124 directs the packet to one of the processing functions within the individual inter-base band limitation processing unit 125 that is in correspondence with the inter-base information (step S175). The one of the processing functions within the individual inter-base band limitation processing unit 125 that is in correspondence with the inter-base information and to which the packet has been directed performs the band limitation process for the packet (step S176).

After that, the port band limitation processing unit (i.e., one of the port band limitation processing units 110a to 110d) limits a total band for all the output packets to the band set value that has been set to the port, the port band limitation processing unit being positioned so as to be employed before the output port through which the packet of which the band has been limited at step S176 is to be output (step S177). Subsequently, the multipoint switching apparatus 3000a outputs the packet from the output port (step S178).

By configuring the multipoint switching apparatus 3000a in this manner, it is possible to limit the band for the communication between the specific bases. Thus, even if packets are transmitted from a plurality of bases to one base through the multipoint switching apparatus 3000a in a congested manner, it is possible to prevent the situation where the band between the multipoint switching apparatus 3000a and the base being the transmission destination of the packets is occupied by the packet from one of the bases with a high ratio, and it is therefore possible to distribute the band among the bases equally.

In addition, because it is possible to set a band limit individually for each combination of bases, it is possible to perform the band limitation process in a finely-tuned manner. Furthermore, it is possible to obtain the band limitation value based on the combination of the identification information of the input port and the destination address contained in the packet, without having to make judgment on the destination port. Consequently, it is possible to perform the process more efficiently and also, it is possible to perform the band limitation process, even if the destination port is unknown.

In the first, the second, and the third embodiments described above, each of the multipoint switching apparatuses shown in FIGS. 3, 11, and 15 is a policer that limits the band of a packet immediately after the packet is input through an input port, before the L2 switch process is performed. Each of the multipoint switching apparatuses shown in FIGS. 7, 9, 13, 14, 18, 20, and 25 is a shaper that limits the band of a packet immediately after the packet is output through an output port, after the L2 switch process is performed.

It is possible to realize the various kinds of processes explained in the description of the first, the second, and the third embodiments, by executing a computer program or a microcode that is prepared in advance, in an integrated circuit such as a Large Scale Integration (LSI). Alternatively, the various kinds of processes may be realized as hardware using wired logic.

So far, the exemplary embodiments of the present invention are explained; however, the present invention is not limited to these examples. The present invention may be realized in any other different modes of embodiment, within the technical spirit and scope of the present invention defined in the claims. Also, the effects of the invention are not limited to the ones stated in the description of the exemplary embodiments.

For example, the description of the exemplary embodiments is based on an assumption that the packet is a normal Transmission Control Protocol/Internet Protocol (TCP/IP) packet. However, the present invention is not limited to this example. The packet may be a Virtual Private Network (VPN) packet to which a control header for a packet transmitted and received within a VPN is added. In other words, the wide area communication network that is constructed by connections made by the multipoint switching apparatus according to the embodiments may be a VPN. Also, the packet used in the description of the exemplary embodiments above may be a VLAN packet used in a VLAN, the VLAN packet being able to multiplex users at a port because of a carrier tag (i.e., a VLAN tag) being appended thereto.

It is acceptable to manually perform all or a part of the processes that have been explained as being automatically performed in the description of the embodiments. Further, it is acceptable to automatically perform all or part of the processes that have been explained as being manually performed, by using a method that is publicly known.

In addition, the processing procedures, the control procedures, the specific names, the information including various types of data and parameters that have been presented in the present document and drawings may be arbitrarily altered, except when it is noted otherwise.

The constituent elements of the apparatuses that are shown in the drawings are based on functional concepts. Thus, it is not necessary to physically configure the elements as indicated in the drawings. In other words, the specific modes of distribution and integration of the apparatuses are not limited to the ones shown in the drawings. It is acceptable to functionally or physically distribute or integrate all or a part of the apparatuses in any arbitrary units, depending on various loads and the status of use.

According to an embodiment of the present invention, it is possible to limit the band for communication between bases. Thus, an advantageous effect is achieved where it is possible to equally distribute the communication band of a transmission path provided between the communication relaying apparatus and the reception-side base, even when packets flow from a plurality of transmission-side bases into the one reception-side base.

In addition, according to an embodiment of the present invention, it is possible to limit the communication band before the relaying process is performed. Thus, an advantageous effect is achieved where it is possible to limit the band for the communication between the bases by reducing the load in the relaying process.

Further, according to an embodiment of the present invention, an advantageous effect is achieved where it is possible to limit the band for the communication between the bases, even when a multicast packet or a broadcast packet of which the destination base information is unspecified is to be transferred, or when an unknown unicast packet of which the destination base information has not been brought into correspondence with any reception-side port and of which the reception-side port cannot be identified based on the destination base information is to be transferred.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication relaying apparatus that performs a relaying process on communication between a transmission base and a plurality of reception bases from among a plurality of bases included in a wide area communication network, the communication relaying apparatus comprising:
    a reception port configured to receive packets via a communication path between the communication relaying apparatus and the transmission base;
    a plurality of transmission ports each configured to transmit packets to a corresponding one of communication paths between the communication relaying apparatus and a corresponding one of the reception bases;
    a band controlling unit that exercises a band control on a packet received at the reception port to limit a communication band of the packet based on destination base information contained in the packet;
    a determining unit that determines a first transmission port from among the transmission ports from where the packet that has been subjected to band control is to be output, and outputs the packet that has been subjected to band control to the first transmission port.

2. The communication relaying apparatus according to claim 1, wherein the band controlling unit exercises the band control so that the communication band of the packet is limited to the communication band specified in correspondence with a combination of one of the transmission port and transmission base information contained in the packet and one of the reception port and destination base information contained in the packet.

3. The communication relaying apparatus according to claim 1, wherein the band controlling unit exercises the band control so that the communication band of the packet is limited according to an output priority level that is set in correspondence with a combination of one of the transmission port and transmission base information contained in the packet and one of the reception port and destination base information contained in the packet.

4. The communication relaying apparatus according to claim 1, wherein the packet is one of a Virtual Local Area Network (VLAN) packet in a VLAN and a Virtual Private Network (VPN) packet in a VPN, the VLAN and the VPN being constructed in the wide area communication network.

5. A communication relaying apparatus that performs a relaying process on communication between a plurality of transmission bases and a plurality of reception bases from among a plurality of bases included in a wide area communication network, the communication relaying apparatus comprising:
    a plurality of reception ports each configured to receive packets via a corresponding one of communication paths between the communication relaying apparatus and a corresponding one of the transmission bases;
    a plurality of transmission ports each configured to transmit packets to a corresponding one of a communication path between the communication relaying apparatus and a corresponding one of the reception base;
    a determining unit that determines a first transmission port from among the transmission ports from where a packet received at a first reception port from among the reception ports is to be output; and
    a band controlling unit that exercises a band control on the packet whose output destination has been determined by the determining unit to limit a communication band of the packet based on transmission base information contained in the packet, and outputs the packet that has been subjected to band control to the first transmission port.

6. The communication relaying apparatus according to claim 5, further comprising a transmission source information adding unit that adds information unique to the first reception port in the packet received at the first reception port as the transmission source information.

7. The communication relaying apparatus according to claim 5, wherein the band controlling unit exercises the band control so that the communication band of the packet is limited to the communication band specified in correspondence with a combination of one of the transmission port and transmission base information contained in the packet and one of the reception port and destination base information contained in the packet.

8. The communication relaying apparatus according to claim 5, wherein the band controlling unit exercises the band control so that the communication band of the packet is limited according to an output priority level that is set in correspondence with a combination of one of the transmission port and transmission base information contained in the packet and one of the reception port and destination base information contained in the packet.

9. The communication relaying apparatus according to claim 5, wherein the packet is one of a Virtual Local Area Network (VLAN) packet in a VLAN and a Virtual Private Network (VPN) packet in a VPN, the VLAN and the VPN being constructed in the wide area communication network.

10. A method of relaying communication to be executed on a relaying apparatus that performs a relaying process on communication between a transmission base and a plurality of reception bases from among a plurality of bases included in a wide area communication network, the communication relaying apparatus including a reception port configured to receive packets via a communication path between the communication relaying apparatus and the transmission base; and a plurality of transmission ports each configured to transmit packets to a corresponding one of communication paths between the communication relaying apparatus and a corresponding one of the reception bases, the method comprising:

exercising a band control on a packet received at the reception port to limit a communication band of the packet based on destination base information contained in the packet; and determining a first transmission port from among the transmission ports from where the packet that has been subjected to band control is to be output, and outputting the packet that has been subjected to band control to the first transmission port.

11. The method according to claim 10, wherein the exercising includes exercising the band control so that the communication band of the packet is limited to the communication band specified in correspondence with a combination of one of the transmission port and transmission base information contained in the packet and one of the reception port and destination base information contained in the packet.

12. The method according to claim 10, wherein the exercising includes exercising the band control so that the communication band of the packet is limited according to an output priority level that is set in correspondence with a combination of one of the transmission port and transmission base information contained in the packet and one of the reception port and destination base information contained in the packet.

13. The method according to claim 10, wherein the packet is one of a Virtual Local Area Network (VLAN) packet in a VLAN and a Virtual Private Network (VPN) packet in a VPN, the VLAN and the VPN being constructed in the wide area communication network.

14. A method of relaying communication to be executed on a communication relaying apparatus that performs a relaying process on communication between a plurality of transmission bases and a plurality of reception bases from among a plurality of bases included in a wide area communication network, the communication relaying apparatus including a plurality of reception ports each configured to receive packets via a corresponding one of communication paths between the communication relaying apparatus and a corresponding one of the transmission bases; and a plurality of transmission ports each configured to transmit packets to a corresponding one of a communication path between the communication relaying apparatus and a corresponding one of the reception base, the method comprising:

determining a first transmission port from among the transmission ports from where a packet received at a first reception port from among the reception ports is to be output; and exercising a band control on the packet whose output destination has been determined at the determining to limit a communication band of the packet based on transmission base information contained in the packet, and outputting the packet that has been subjected to band control to the first transmission port.

15. The method according to claim 14, further comprising adding information unique to the first reception port in the packet received at the first reception port as the transmission source information.

16. The method according to claim 14, wherein the exercising includes exercising the band control so that the communication band of the packet is limited to the communication band specified in correspondence with a combination of one of the transmission port and transmission base information contained in the packet and one of the reception port and destination base information contained in the packet.

17. The method according to claim 14, wherein the exercising includes exercising the band control so that the communication band of the packet is limited according to an output priority level that is set in correspondence with a combination of one of the transmission port and transmission base information contained in the packet and one of the reception port and destination base information contained in the packet.

18. The method according to claim 14, wherein the packet is one of a Virtual Local Area Network (VLAN) packet in a VLAN and a Virtual Private Network (VPN) packet in a VPN, the VLAN and the VPN being constructed in the wide area communication network.

* * * * *